US012463385B2

(12) United States Patent
Liong et al.

(10) Patent No.: US 12,463,385 B2
(45) Date of Patent: Nov. 4, 2025

(54) PLUG CONNECTOR AND RECEPTACLE CONNECTOR

(71) Applicant: Molex, LLC, Lisle, IL (US)

(72) Inventors: Weng-Heng Liong, Jurong Town (SG); Chee Kit Chew, Jurong Town (SG)

(73) Assignee: Molex, LLC, Lisle, IL (US)

( * ) Notice: Subject to any disclaimer, the term of this patent is extended or adjusted under 35 U.S.C. 154(b) by 594 days.

(21) Appl. No.: 17/869,804

(22) Filed: Jul. 21, 2022

(65) Prior Publication Data

US 2023/0058246 A1 Feb. 23, 2023

(30) Foreign Application Priority Data

Aug. 20, 2021 (CN) ........................ 202110961293.X

(51) Int. Cl.

| | |
|---|---|
| ***H01R 13/6585*** | (2011.01) |
| ***H01R 4/02*** | (2006.01) |
| ***H01R 12/73*** | (2011.01) |
| ***H01R 13/04*** | (2006.01) |
| ***H01R 13/10*** | (2006.01) |
| ***H01R 13/627*** | (2006.01) |

(Continued)

(52) U.S. Cl.

CPC ......... *H01R 13/6585* (2013.01); *H01R 4/029* (2013.01); *H01R 12/737* (2013.01); *H01R 13/04* (2013.01); *H01R 13/10* (2013.01); *H01R 13/627* (2013.01); *H01R 13/629* (2013.01); *H01R 13/6461* (2013.01)

(58) Field of Classification Search

CPC .... H01R 13/6585; H01R 13/04; H01R 13/10; H01R 13/627; H01R 13/629; H01R 13/6461; H01R 4/029; H01R 12/737

See application file for complete search history.

(56) References Cited

U.S. PATENT DOCUMENTS 5,630,730 A 5/1997 Wang et al.
7,128,611 B2 * 10/2006 Tanaka .................. H01R 31/06 439/108

(Continued)

FOREIGN PATENT DOCUMENTS

CN 202076606 U 12/2011
CN 102820589 A 12/2012

(Continued)

*Primary Examiner* — Thanh Tam T Le

(57) ABSTRACT

Plug and receptacle connectors for improving crosstalk are provided. The plug connector includes a first set of plug terminals, a second set of plug terminals, a first plate-shaped shielding member, and a second plate-shaped shielding member. The first set of plug terminals include first ground terminals and first signal terminals, where the first plate-shaped shielding member is provided below the first set of plug terminals. The first plate-shaped shielding member is welded to the first ground terminals and transversely crosses and covers the first signal terminals without contacting the first signal terminals. The second set of plug terminals include second ground terminals and second signal terminals, where the second plate-shaped shielding member is provided above the second set of plug terminals. The second plate-shaped shielding member is welded to the second ground terminals and transversely crosses and covers the second signal terminals without contacting the second signal terminals.

18 Claims, 18 Drawing Sheets

(51) Int. Cl.
*H01R 13/629* (2006.01)
*H01R 13/6461* (2011.01)

(56) References Cited

U.S. PATENT DOCUMENTS

| | | | | |
|---|---|---|---|---|
| 7,402,077 | B2 | 7/2008 | Shindo | |
| 8,221,139 | B2 | 7/2012 | Qin et al. | |
| 8,342,886 | B2 * | 1/2013 | Zhang | H01R 12/725 439/660 |
| 8,353,726 | B2 * | 1/2013 | Zhang | H01R 13/659 439/637 |
| 8,545,240 | B2 * | 10/2013 | Casher | H01R 13/6474 439/108 |
| 8,702,451 | B2 * | 4/2014 | Luo | H01R 12/725 439/637 |
| 8,858,243 | B2 * | 10/2014 | Luo | H01R 31/08 439/607.05 |
| 8,944,849 | B1 * | 2/2015 | Yang | H01R 13/6588 439/607.07 |
| 9,276,342 | B2 * | 3/2016 | Masubuchi | H01R 31/08 |
| 9,281,589 | B2 * | 3/2016 | Hsiao | H01R 4/04 |
| 9,337,585 | B1 * | 5/2016 | Yang | H01R 13/6583 |
| 9,455,530 | B2 * | 9/2016 | Patel | H01R 13/6597 |
| 9,577,370 | B2 * | 2/2017 | Lin | H01R 13/6471 |
| 9,583,882 | B1 * | 2/2017 | Hsueh | H01R 12/724 |
| 9,640,915 | B2 * | 5/2017 | Phillips | H01R 13/6585 |
| 10,103,501 | B2 * | 10/2018 | Lin | H01R 13/6591 |
| 10,847,936 | B2 * | 11/2020 | Tang | H01R 13/502 |
| 10,944,189 | B2 * | 3/2021 | Xu | H01R 12/75 |
| 11,056,834 | B2 * | 7/2021 | Casher | H01R 13/2442 |
| 11,146,024 | B2 * | 10/2021 | Liong | H01R 12/737 |
| 11,381,039 | B2 * | 7/2022 | Hsiao | H01R 24/62 |
| 11,398,693 | B2 * | 7/2022 | Yang | H01R 31/08 |
| 2008/0242139 | A1 | 10/2008 | Matsuoka | |

FOREIGN PATENT DOCUMENTS

| | | | |
|---|---|---|---|
| CN | 205621919 | U | 10/2016 |
| EP | 0196977 | A2 | 10/1986 |
| TW | I379466 | B | 12/2012 |
| TW | I519016 | B | 1/2016 |
| TW | I722581 | B | 3/2021 |

* cited by examiner

PLUG CONNECTOR AND RECEPTACLE CONNECTOR

CROSS-REFERENCE TO RELATED APPLICATION

This application claims the benefit of and priority to Chinese Patent Application No. 202110961293.X filed on Aug. 20, 2021, which is incorporated herein by reference in its entirety.

TECHNICAL FIELD

The present disclosure relates to a plug connector and a receptacle connector and, more particularly, to a plug connector and a receptacle connector, each having a grounding element.

BACKGROUND

Due to the need for a connector having high-speed transmission of a signal and a reduced volume of the connector, an arrangement between terminals is generally increased and, as a result, crosstalk between signal terminals is generated. In existing solutions, a grounding member is provided between signal terminals to isolate crosstalk between the signal terminals.

Chinese Utility Model Patent Publication No. CN205621919U discloses a grounding member, where the grounding member includes a conductive body and a plurality of extension portions that extend from the conductive body. Each extension portion has a constraining portion at least one side edge of each extension portion; main body portions of ground terminals are fixed in an insulating body, and contact portions of the ground terminals are arranged on surfaces of a tongue respectively. The main body portion of the ground terminal is stacked with the extension portion of the corresponding grounding member and contacts the constraining portion which is positioned at the side edge of the extension portion. As the grounding member is assembled from a rear end of the insulating body, a position of the grounding member is positioned at the main body portion of the ground terminal, and the constraining portion of the grounding member contacts is the main body portion of the ground terminal instead of the contact portion of the ground terminal. As a result, a distance between a position where the grounding member and the main body portion of the ground terminal contact each other and an actual contact point where the contact portion of the ground terminal is mated is long.

Chinese Utility Model Patent Publication No. CN202076606U discloses a first grounding element which is assembled to a front end of a tongue, where the first grounding element is connected with a contact segment of a ground terminal via an elastic branch. Though the first grounding element is connected with the contact segment of the ground terminal, the first grounding element is assembled from the front end of the tongue, the elastic branch of the first grounding element contacts a tip of the contact segment of the ground terminal, and a distance between a position where the first grounding element and the contact segment of the ground terminal contact each other and an actual contact point where the contact segment of the ground terminal is mated is still long.

Chinese Patent Publication No. CN102820589A discloses a technology in which each ground contact includes a linear contact portion, a terminal portion, and a podium. Substantially at centers of the three ground contacts, the podiums are integrally connected by a substantially flat bus bar. A channel is formed between the two ground contacts, and a pair of signal contacts is provided via the channel which passes through below the bus bar. In addition, in this technology, channels for receiving the ground contacts are jointed together by elongated hollow connection channels extending between two ends of each series, where dimensions of the hollow connection channels are appropriately chosen to accommodate and hold the bus bar. As the bus bar between the two ground contacts is connected to side edges of the two ground contacts, a certain length of the ground contact has to be left for connection with the bus bar which will increase the length of the ground contact, or make is difficult to allow the ground contact to be made shorter. Also, it needs to provide a bending portion for each of a pair of signal contacts in order to avoid the bus bar, which causes the bending portions of the pair of signal contacts not to be arranged side by side with the ground contacts such that integrity of the signal is affected. Moreover, in this technology, a long transverse groove (that is the hollow connection channel) is required in a housing to accommodate the transverse bus bar between the two ground contacts, holding forces for the signal contact and the ground contact due to interference between the signal contact and the ground contact. Also, the housing is lowered and the strength of the housing is reduced.

BRIEF SUMMARY

Therefore, an object of the present disclosure is to provide a plug connector which improves crosstalk in connectors.

Another object of the present disclosure is to provide a receptacle connector which improve crosstalk in connectors.

Accordingly, a plug connector of the present disclosure comprises a plug housing, a first set of plug terminals, a second set of plug terminals, a first plate-shaped shielding member, and a second plate-shaped shielding member. The plug housing comprises a base which transversely extends and a tongue portion which extends forwardly from the base. The first set of plug terminals are provided to the plug housing as an upper row and comprise a plurality of first ground terminals and a plurality of first signal terminals. Each first ground terminal and each first signal terminal each has a first plate-shaped contact portion, where the first plate-shaped contact portion is positioned on an upper surface of the tongue portion. The second set of plug terminals are provided to the plug housing as a lower row and comprise a plurality of second ground terminals and a plurality of second signal terminals. Each second ground terminal and each second signal terminal each has a second plate-shaped contact portion, where the second plate-shaped contact portion is positioned on a lower surface of the tongue portion. The first plate-shaped shielding member is provided below the first plate-shaped contact portions of the first set of plug terminals. The first plate-shaped shielding member comprises multiple first welding portions and first transverse shielding plate portions each of which being connected between every two corresponding first welding portions. The multiple first welding portion are welded to the first plate-shaped contact portion of the plurality of first ground terminal respectively. The first transverse shielding plate portion transversely crosses and covers the first plate-shaped contact portion of the corresponding first signal terminal without contacting the corresponding first signal terminal. The second plate-shaped shielding member is provided above the second plate-shaped contact portions of the second set of plug terminals, where the second plate-shaped shielding member comprises multiple second welding portions and second transverse shielding plate portions each of which being connected between every two corresponding second welding portions. The multiple second welding portions are welded to the second plate-shaped contact portions of the plurality of second ground terminals, and the second transverse shielding plate portion transversely crosses and covers the contact portion of the corresponding second signal terminal without contacting the corresponding second signal terminal. The first plate-shaped shielding member and the second plate-shaped shielding member are positioned between the first set of plug terminals and the second set of plug terminals.

In some embodiments, the first plate-shaped shielding member and the second plate-shaped shielding member are mechanically and electrically connected with each other.

In some embodiments, one of the first plate-shaped shielding member and the second plate-shaped shielding member has a contact finger to connect the other of the first plate-shaped shielding member and the second plate-shaped shielding member.

In some embodiments, the first plate-shaped shielding member is provided with windows which correspond to the plurality of first signal terminals, and the second plate-shaped shielding member is provided with windows which correspond to the plurality of the second signal terminals.

In some embodiments, each second signal terminal comprises a tail portion and a bending portion which is positioned between the second plate-shaped contact portion and the tail portion. Each second ground terminal comprises a tail portion, a bending portion which is positioned between the second plate-shaped contact portion and the tail portion, and a tie bar connecting portion. The plurality of second ground terminals and the plurality of second signal terminals are alternately arranged. The bending portion and the tie bar connecting portion of each second ground terminal are forked relative to each other and are spaced apart from each other in a front-rear direction. The plug connector further comprises a tie bar, where the tie bar is connected between the tie bar connecting portions of at least two of the plurality of second ground terminals. The second plate-shaped contact portions of the plurality of second signal terminals and the second plate-shaped contact portions of the plurality of second ground terminals positioned between the plurality of second signal terminals are transversely aligned with each other and are positioned in the same row. The tail portions of the plurality of second signal terminals and the tail portions of the plurality of second ground terminals positioned between the plurality of second signal terminals are transversely aligned with each other and are positioned in the same row. The bending portions of the plurality of second signal terminals and the bending portions of the plurality of second ground terminals positioned between the plurality of second signal terminals are transversely aligned with each other and are positioned in the same row.

In some embodiments, the tie bar avoids the bending portions of the plurality of second signal terminals, is uprightly positioned behind the bending portions of the plurality of second ground terminals, and spans the plurality of second signal terminals without contacting the plurality of second signal terminals. The tie bar is positioned between the second plate-shaped contact portions and the tail portions of the plurality of second signal terminals.

In some embodiments, the bending portion of each second ground terminal is separated from a center of the tie bar connecting portion relative to the tie bar connecting portion and is forwardly spaced apart from the center of the tie bar connecting portion, where the tie bar connects portion comprises a pair of connecting strips which are spaced apart from each other.

In some embodiments, the plug housing is formed by assembling a first half housing and a second half housing. The first half housing has a first base portion and a first plate portion, where the first set of plug terminals and the first plate-shaped shielding member are engaged with the first half housing through integral injection molding, the first plate-shaped contact portions of the first set of plug terminals are exposed to an upper surface of the first plate portion, and the first plate-shaped shielding member is exposed to a lower surface of the first plate portion. The second half housing has a second base portion and a second plate portion, where the second set of plug terminals and the second plate-shaped shielding member are engaged with the second half housing through integral injection molding, the second plate-shaped contact portions of the second set of plug terminals are exposed to a lower surface of the second plate portion, and the second plate-shaped shielding member is exposed to an upper surface of the second plate portion. The first base portion and the second base portion are assembled to constitute the base of the plug housing, and the first plate portion and the second plate portion are assembled to constitute the tongue portion of the plug housing.

In some embodiments, the plug housing further comprises a stage portion which is provided to the tongue portion, where the first half housing further has a rear stage portion which is provided to the first plate portion, the second half housing further has a front stage portion which is provided to the second plate portion, and the plug housing further comprises an insertion component and a first latching construction. The insertion component is provided between the rear stage portion and the front stage portion and provides insertion between the rear stage portion and the front stage portion to form the stage portion. The first latching construction is provided between the first base portion and the second base portion and provides assembling of the first base portion and the second base portion to form the base of the plug housing.

In some embodiments, the insertion component comprises an insertion block which is positioned at a front end of the rear stage portion and an insertion groove which is positioned at a rear end of the front stage portion, where the insertion block positioned at the front end of the rear stage portion is used to insert into the insertion groove positioned at the rear end of the front stage portion.

In some embodiments, the insertion block is provided with a rib which is used to interfere with the insertion groove so as to strengthen a holding force on the insertion block when the insertion block inserts into the insertion groove.

In some embodiments, the first latching construction comprises two latching blocks which are respectively provided on two sides of the first base portion, two recessed rails which are respectively provided on two sides of the second base portion, and two cooperative latching blocks which are respectively provided in the two recessed rails. The two sides of the first base portion are capable of sliding into the two recessed rails respectively provided on the two sides of the second base portion, and the two latching blocks latch with the two cooperative latching blocks respectively.

In some embodiments, the plug housing further comprises a second snapping construction, where the second snapping construction is provided between a rear end of the first base portion and a rear end of the second base portion.

In some embodiments, the second snapping construction includes a snapping ring which is provided to the rear end of the first base portion and a snapping block which is provided to the rear end of the second base portion.

In some embodiments, front ends of the first set of plug terminals partially protrude from a front end of the first plate portion, a front end of the second plate portion is provided with recessed grooves, and the recessed grooves are used to respectively receive the front ends of the first set of plug terminals which protrude from the first plate portion.

A plug connector of the present disclosure may include a plug housing, a first set of plug terminals, and a second set of plug terminals. The plug housing comprises a base which transversely extends and a tongue portion which extends forwardly from the base. The first set of plug terminals are provided to the plug housing. The second set of plug terminals are provided to the plug housing and comprise a plurality of signal terminals, a plurality of ground terminals, and a tie bar. Each signal terminal has a contact portion, a tail portion, and a bending portion which is positioned between the contact portion and the tail portion. The plurality of ground terminals are alternately arranged with the plurality of signal terminals, and each ground terminal has a contact portion, a tail portion, and a bending portion positioned between the contact portion and the tail portion, and a tie bar connecting portion. The bending portion and the tie bar connecting portion of each second ground terminal are forked relative to each other and are spaced apart from each other in a front-rear direction. The tie bar is connected between the tie bar connections of at least two of the plurality of ground terminals. The second contact portions of the plurality of signal terminals and the contact portions of the plurality of ground terminals positioned between the plurality of signal terminals are transversely aligned with each other and are positioned in the same row. The tail portions of the plurality of signal terminals and the tail portions of the plurality of ground terminals positioned between the plurality of signal terminals are transversely aligned with each other and are positioned in the same row. The bending portions of the plurality of signal terminals and the bending portions of the plurality of ground terminals positioned between the plurality of signal terminals are transversely aligned with each other and are positioned in the same row.

A plug connector of the present disclosure comprises a plug housing, a first plug terminal, a second plug terminal, a first plate-shaped shielding member, and a second plate-shaped shielding member. The plug housing comprises a base which transversely extends and a tongue portion which extends forwardly from the base. The plug housing is formed by assembling a first half housing and a second half housing. The first plug terminal has a first plate-shaped contact portion. The second plug terminal has a second plate-shaped contact portion. The first half housing has a first base portion and a first plate portion, where the first plug terminal and the first plate-shaped shielding member are engaged with the first half housing through integral injection molding, the first plate-shaped contact portion of the first plug terminal is exposed to an upper surface of the first plate portion, and the first plate-shaped shielding member is exposed to a lower surface of the first plate portion. The second half housing has a second base portion and a second plate portion, where the second plug terminal and the second plate-shaped shielding member are engaged with the second half housing through integral injection molding, the second plate-shaped contact portion of the second plug terminal is exposed to a lower surface of the second plate portion, and the second plate-shaped shielding member is exposed to an upper surface of the second plate portion. The first base portion and the second base portion are assembled to form the base of the plug housing, where the first plate portion and the second plate portion are assembled to form the tongue portion of the plug housing.

A receptacle connector of the present disclosure comprises a receptacle housing, a first set of receptacle terminals, and a second set of receptacle terminals. The first set of receptacle terminals comprises first ground terminals and first signal terminals which are alternately arranged, a first common grounding member, and a first holding base. Each first ground terminal and each first signal terminal each has a fixed portion which is fixed to the receptacle housing. The first common grounding member has protruding connection portions which are respectively positioned toward the first ground terminal and transverse bridge portions which are positioned between the protruding connection portions, the protruding connection portions of the first common grounding member being connected to the fixed portions of the first ground terminals respectively. The transverse bridge portion transversely crosses the corresponding first signal terminal which is positioned between the corresponding first ground terminals. The transverse bridge portion does not contact the corresponding first signal terminal. The first common grounding member and the fixed portions of the first set of receptacle terminals are together embedded in the first holding base by injection molding, where the first holding base is assembled to the receptacle housing. The second set of receptacle terminals comprise second ground terminals and second signal terminals which are alternately arranged, a second common grounding member, and a second holding base. Each second ground terminal and each second signal terminal each has a fixed portion which is fixed to the receptacle housing. The second common grounding member has protruding connection portions which are respectively positioned toward the second ground terminals and transverse bridge portion which are positioned between the protruding connection portions, the protruding connection portions of the second common grounding member being connected to the fixed portions of the second ground terminals respectively. The transverse bridge portion transversely crosses the corresponding second signal terminal which is positioned between the corresponding second ground terminals and the transverse bridge portion does not contact the corresponding second signal terminal. The second common grounding member and the fixed portions of the second set of receptacle terminals are together embedded in the second holding base by injection molding, where the second holding base is assembled to the receptacle housing.

In some embodiments, the protruding connection portions of the first common grounding member are respectively connected to the fixed portions of the first ground terminals by welding, and the protruding connection portions of the second common grounding member are respectively connected to the fixed portion of the second ground terminals by welding.

In some embodiments, the protruding connection portion of the first common grounding member has a flowing passageway, where the flowing passageway allows a material which is used to form the first holding base in injection molding to flow therethrough and fill therein. The protruding connection portion of the second common grounding member has a flowing passageway, where the flowing passageway allows a material which is used to form the second holding base in injection molding to flow therethrough and fill therein.

In some embodiments, the first holding base has recessed holes which are used to allow the protruding connection portions of the first common grounding member and the fixed portion of the first ground terminals to be respectively exposed therein. The second holding base has recessed holes which are used to allow the protruding connection portions of the second common grounding member and the fixed portions of the second ground terminals to be respectively exposed therein.

In some embodiments, the first common grounding member and the second common grounding member are interposed between the first set of receptacle terminals and the second set of receptacle terminals.

In some embodiments, besides the first set of receptacle terminals, the receptacle connector further comprises other receptacle terminals which correspond to the first set of receptacle terminals and are pins fixed to the receptacle housing.

Besides the second set of receptacle terminals, the receptacle connector further comprises other receptacle terminals which correspond to the second set of receptacle terminals and are pins fixed to the receptacle housing.

By the design and the manner of arrangement of the plate-shaped shielding members of the plug connector in the present disclosure, crosstalk between the two rows of the signal terminals can be reduced, more complete and full shielding function can be formed with respect to the signal terminals, crosstalk is lowered, impedance of the terminal is lowered, coupling between the differential signal terminal pairs is strengthened so that integrity of the signal is promoted, and transmission speed of the signal is increased.

Accordingly, the plug housing is formed by assembling the first half housing and the second half housing, such that a complete assembling of the plug terminals and the plate-shaped shielding member and a complete assembling of the plug terminals and the plate-shaped shielding member can be promoted.

Due to the tie bar, which avoids the extension paths of the signal terminals and connects the adjacent ground terminals, the lengths of the ground terminals will not be increased and grounding completeness between the ground terminals can be provided. Additionally, the ground terminals and the signal terminals can be completely and correspondingly arranged side by side in lengths thereof and integrity of the signal is promoted. Also, the tie bar is uprightly positioned between the bending portions and the tail portions of the corresponding signal terminals, thereby shielding crosstalk between the signal terminals and the circuit board positioned behind the signal terminals.

By the design and the manner of arrangement of the common grounding members of the receptacle connector in the present disclosure, crosstalk between the two rows of the signal terminals can be reduced, more complete and full shielding function can be formed with respect to the signal terminals, crosstalk is lowered, impedance of the terminal is lowered, coupling between the differential signal terminal pairs is strengthened so that integrity of the signal is promoted, and transmission speed of the signal is increased.

BRIEF DESCRIPTION OF THE DRAWINGS

Other features and effects of the present disclosure will be apparent in embodiments illustrated in the drawings, in which.

DETAILED DESCRIPTION

Figure 1:
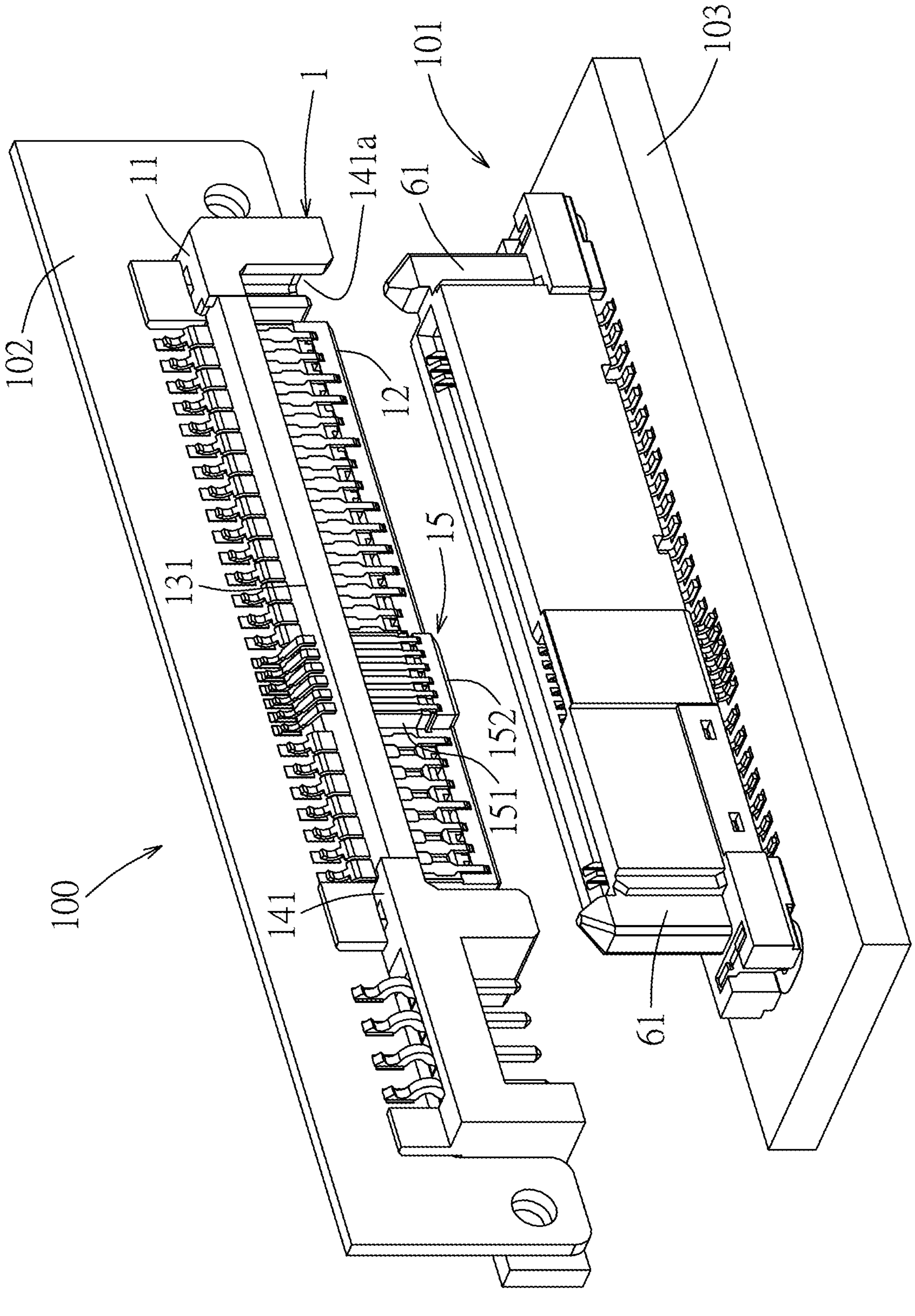
FIG. 1 is a perspective view of an embodiment of a plug connector and a receptacle connector of the present disclosure.

Before the present disclosure is described in detail, it should be noted that like elements are represented by the same reference numerals in the following description.

Figure 2:
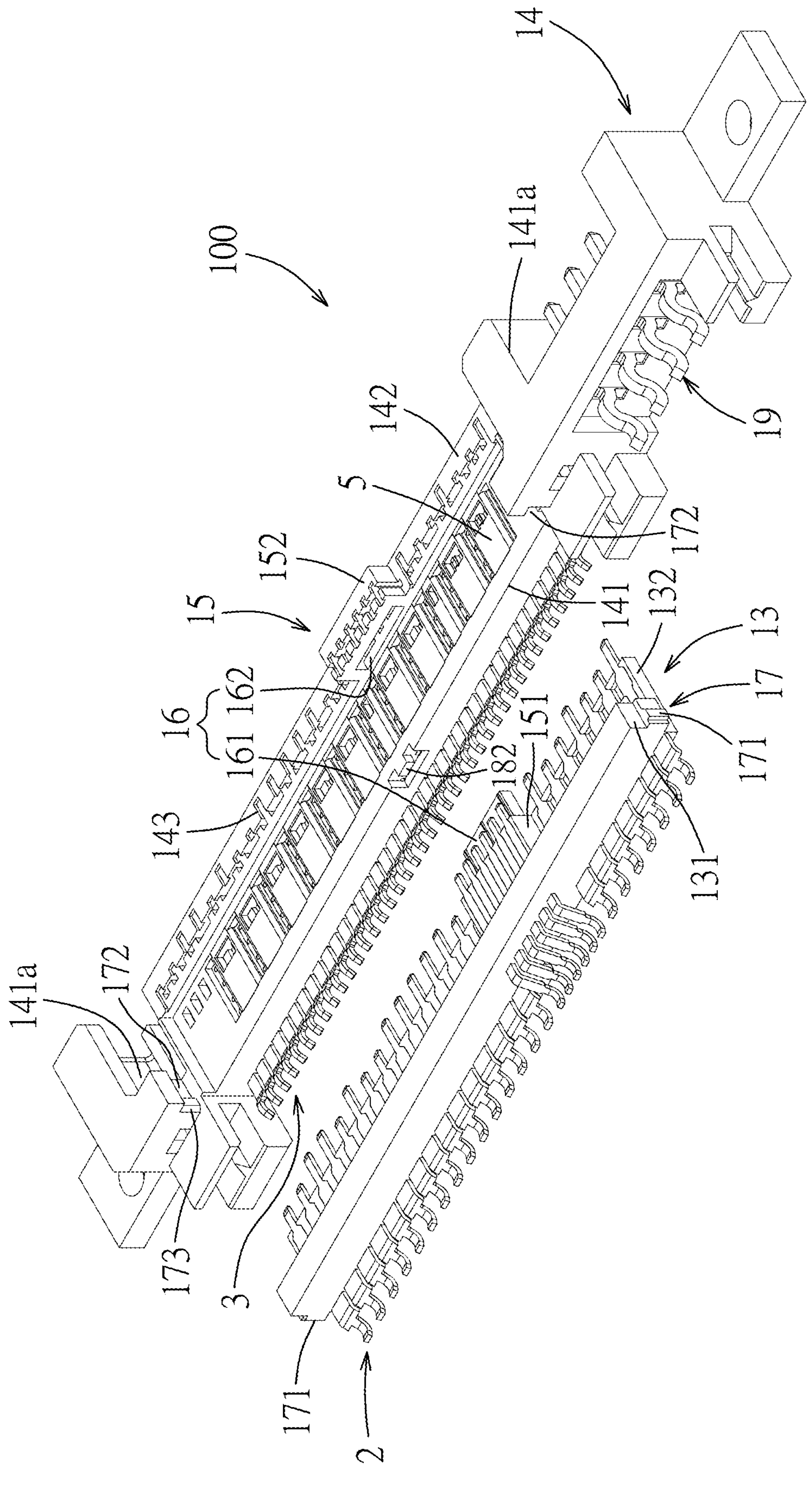
FIG. 2 is a perspective exploded view of the embodiment of the plug connector illustrating a first half housing and a second half housing of the plug connector.
Figure 3:
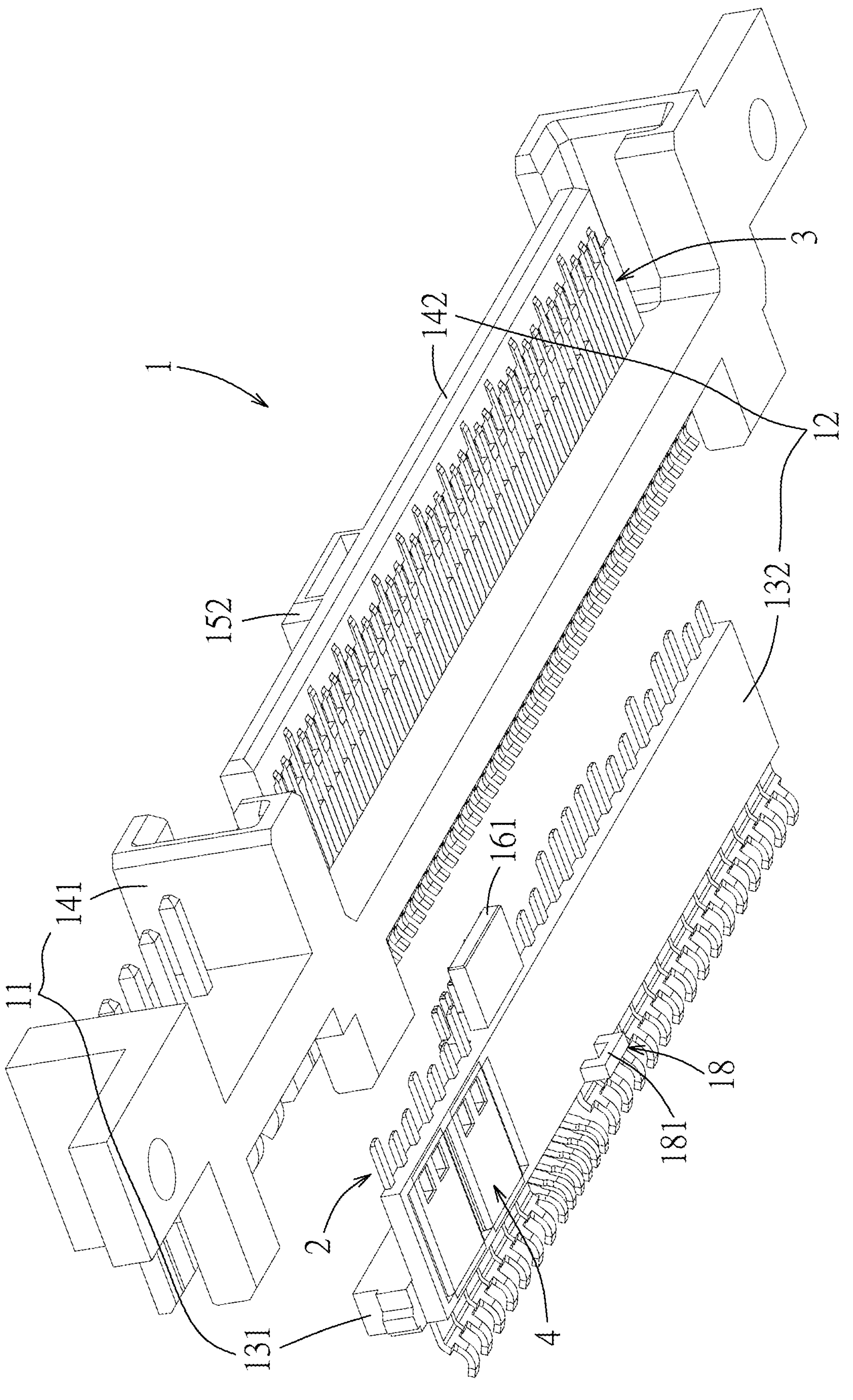
FIG. 3 is a perspective exploded view of the first half housing and the second half housing from another angle.
Figure 11:
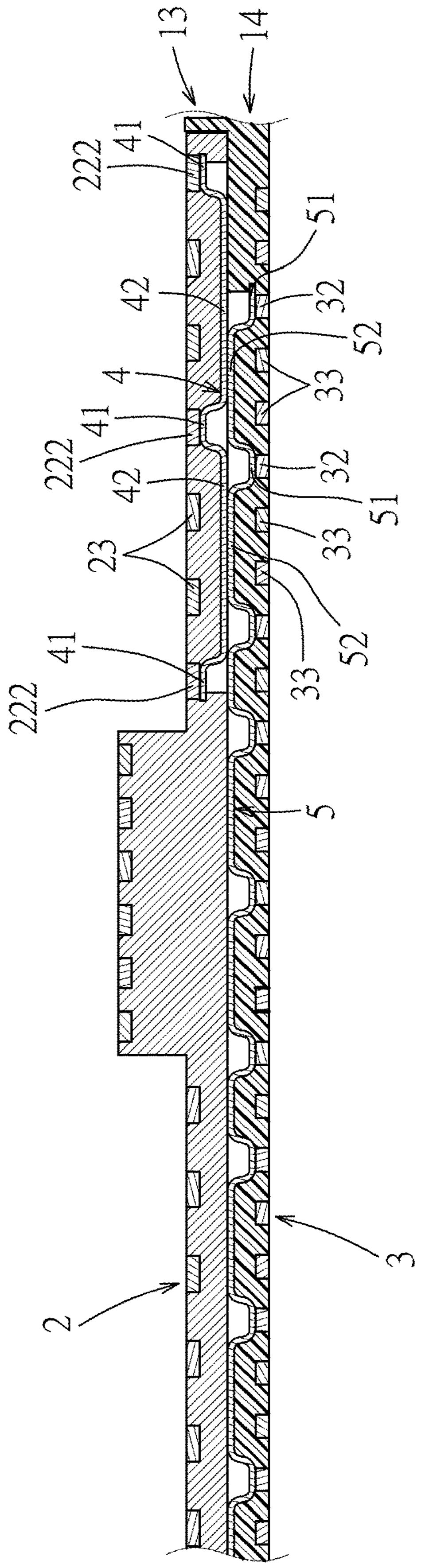
FIG. 11 is a partial cross-sectional view of the embodiment of the plug connector illustrating that the first plate-shaped shielding member and the second plate-shaped shielding member are provided between the first set of plug terminals and the second set of plug terminals.
Figure 12:
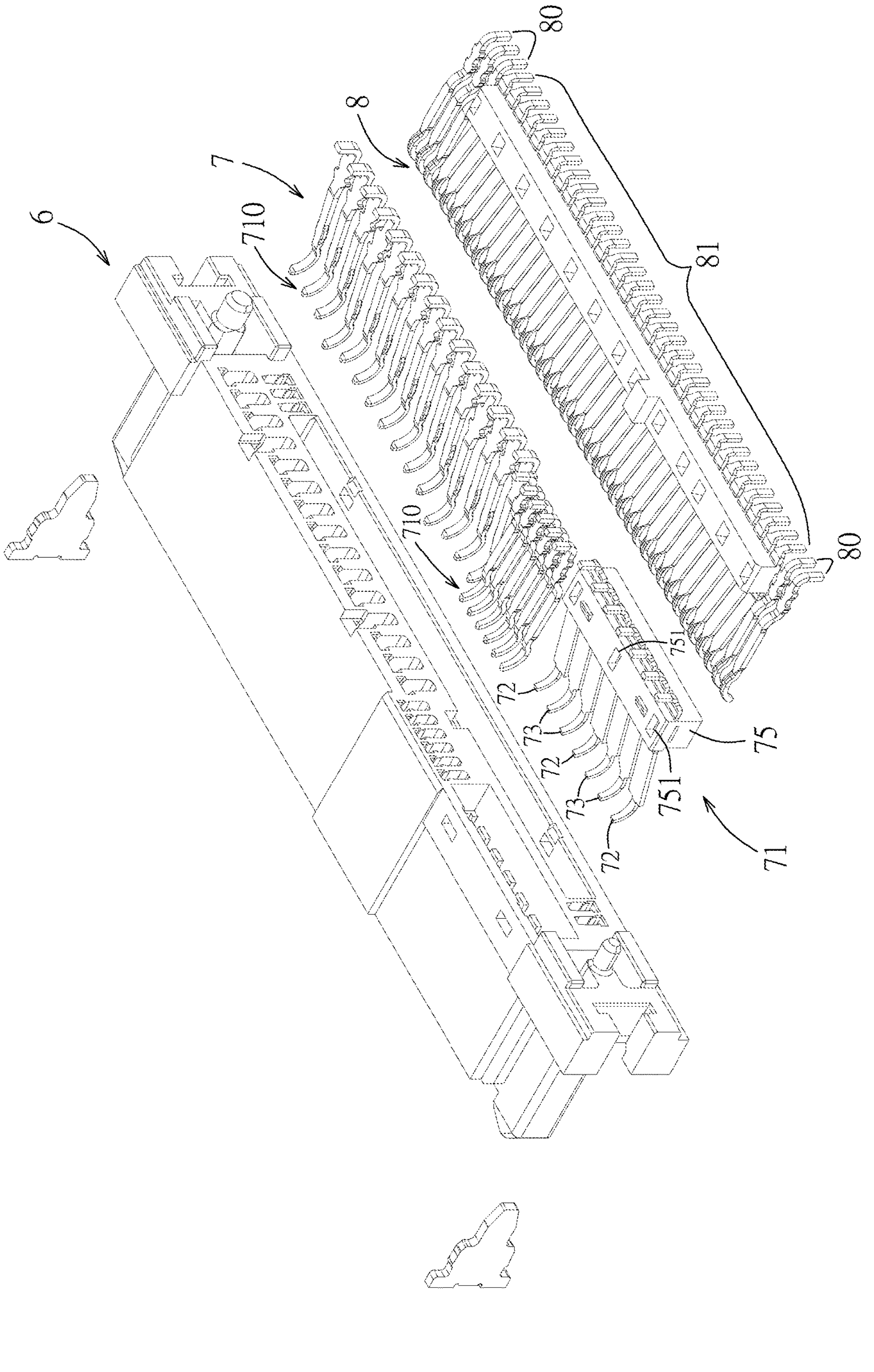
FIG. 12 is a perspective exploded view of the embodiment of the receptacle connector of the present disclosure illustrating that the receptacle connector includes a receptacle housing, a first set of receptacle terminals and a second set of receptacle terminals.
Figure 13:
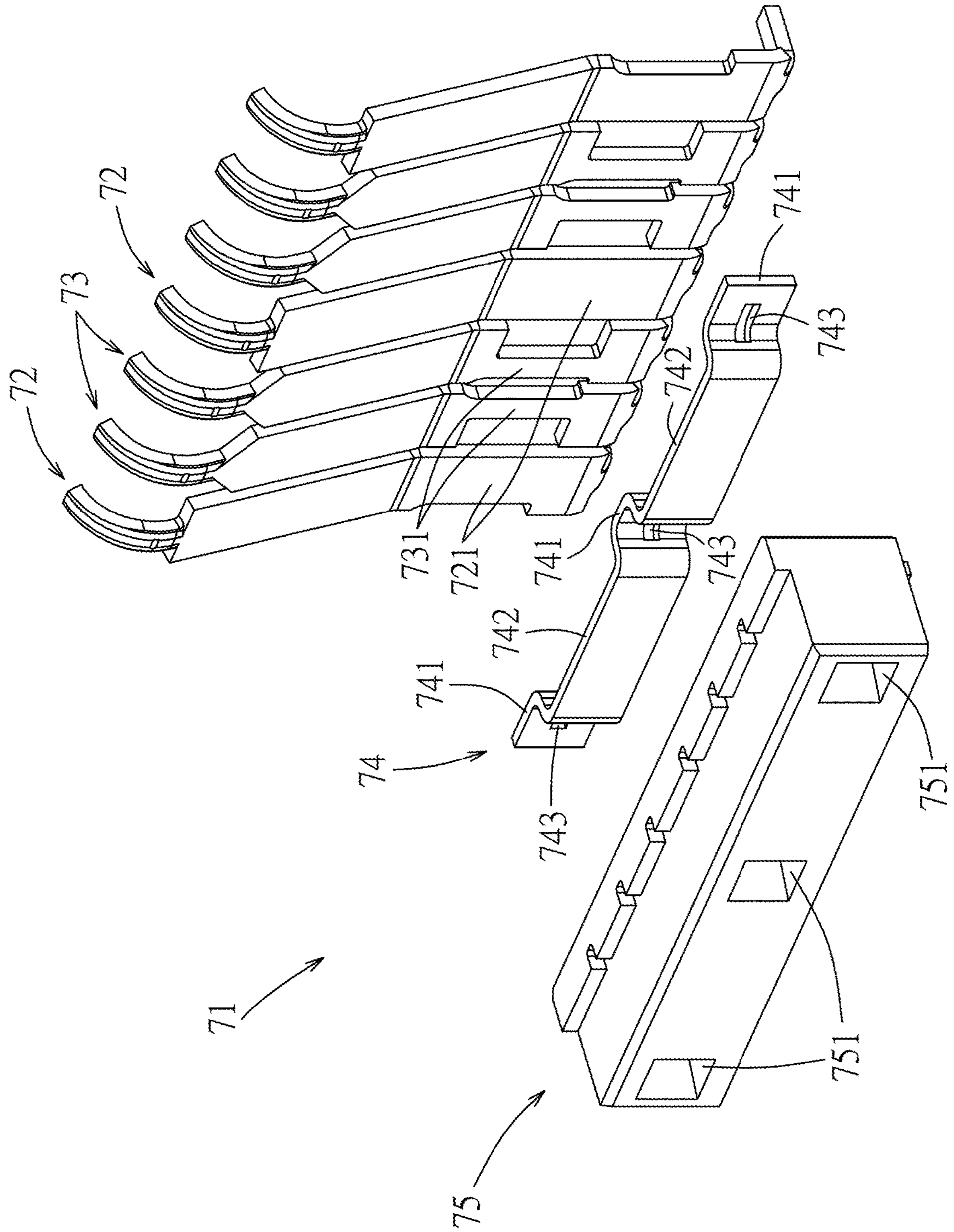
FIG. 13 is an exploded view of the first set of receptacle terminals.
Figure 14:
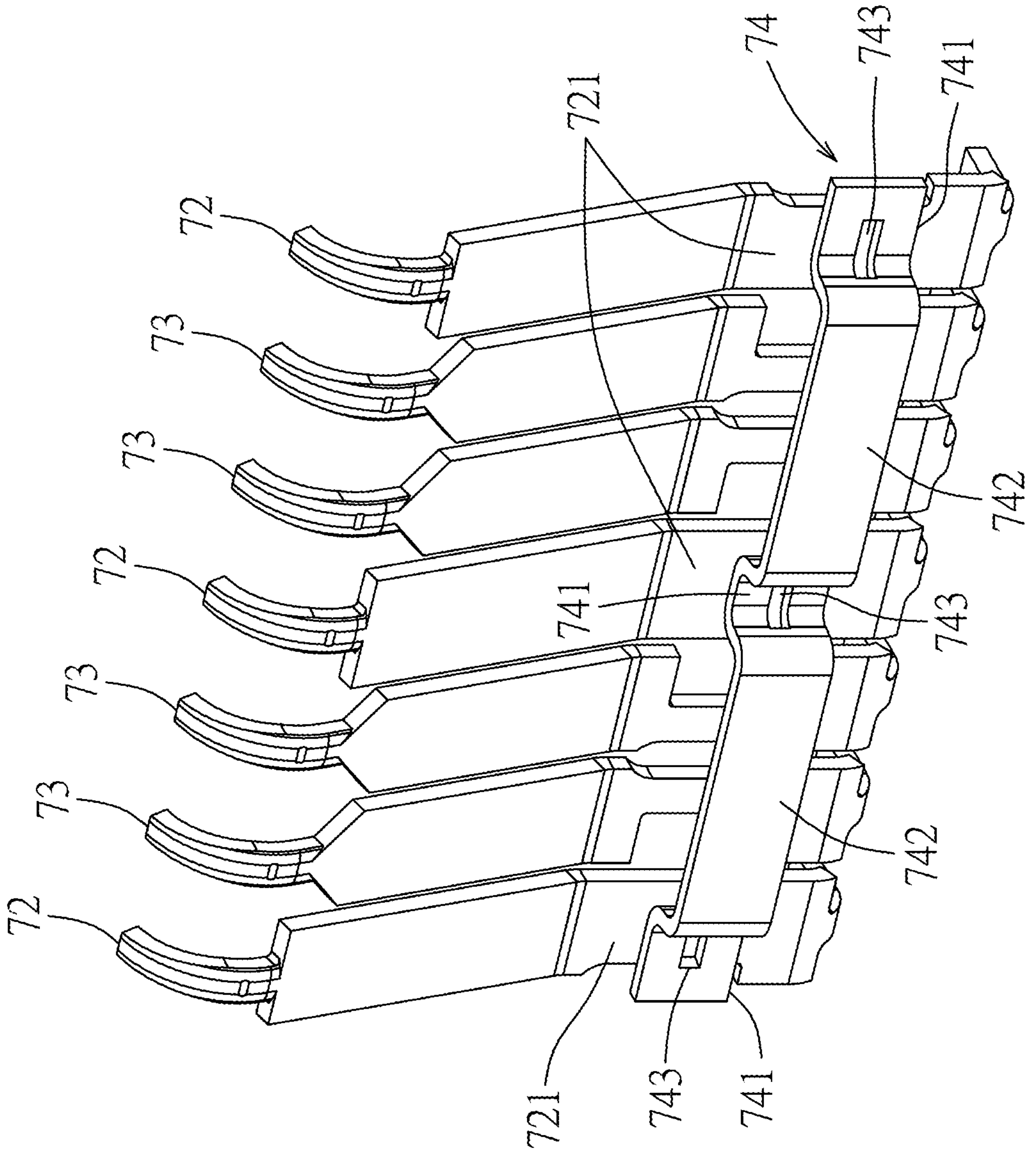
FIG. 14 is a perspective view in which a first common grounding member of the first set of receptacle terminals is engaged with the first set of receptacle terminals.
Figure 15:
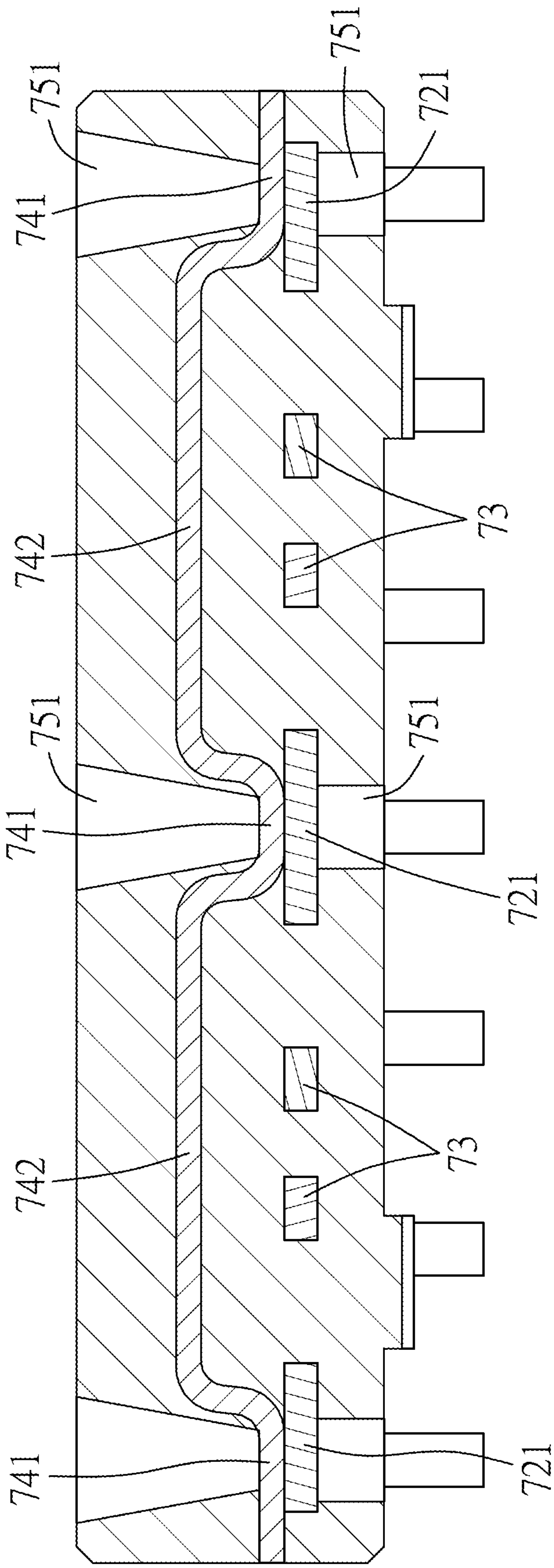
FIG. 15 is a partial cross-sectional view of the embodiment of the plug connector illustrating a position relationship between the first common grounding member and first ground terminals.
Figure 16:
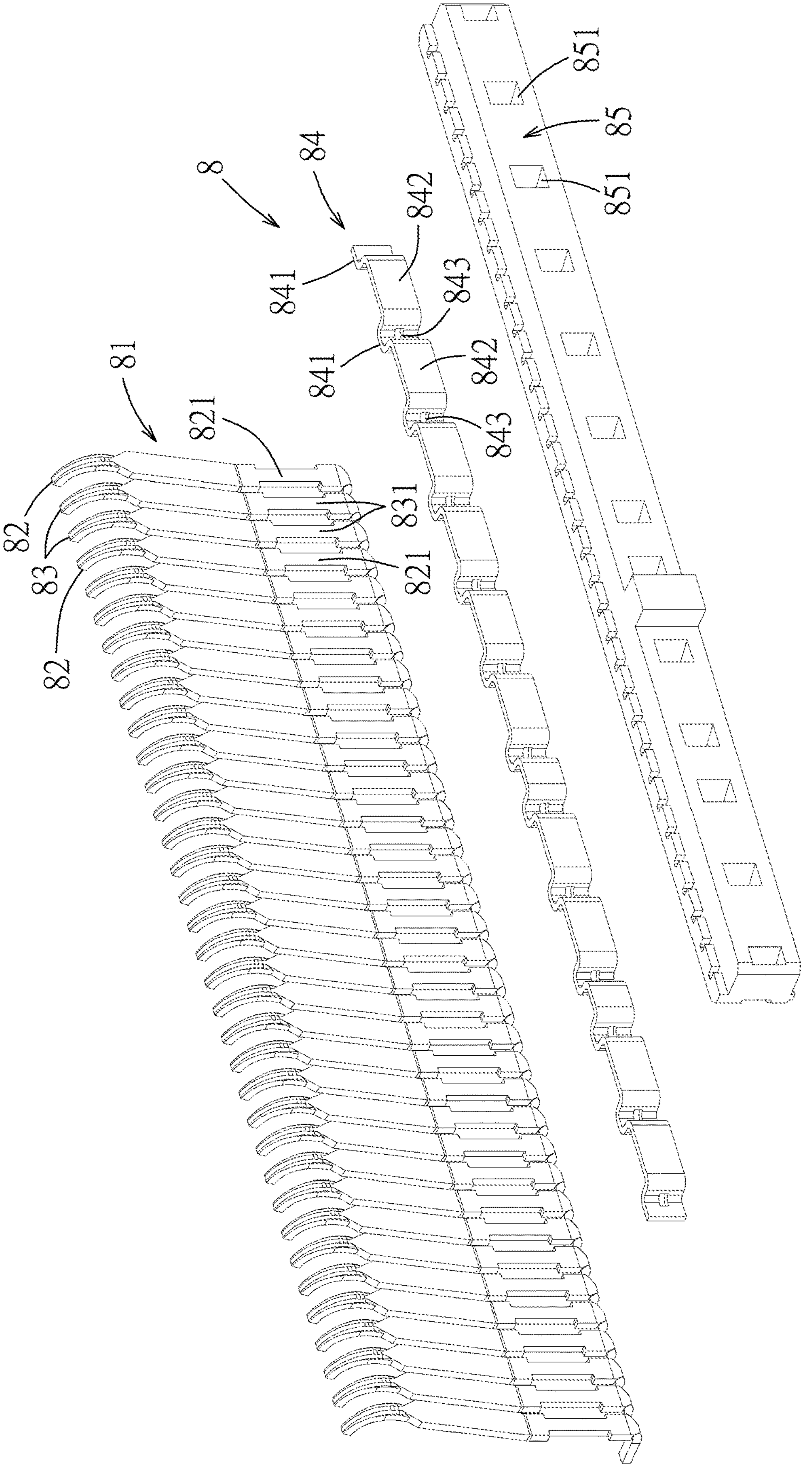
FIG. 16 is an exploded view of the second set of receptacle terminals illustrating that the second set of receptacle terminals includes a second holding base, a second common grounding member, second ground terminals and second signal terminals.
Figure 17:
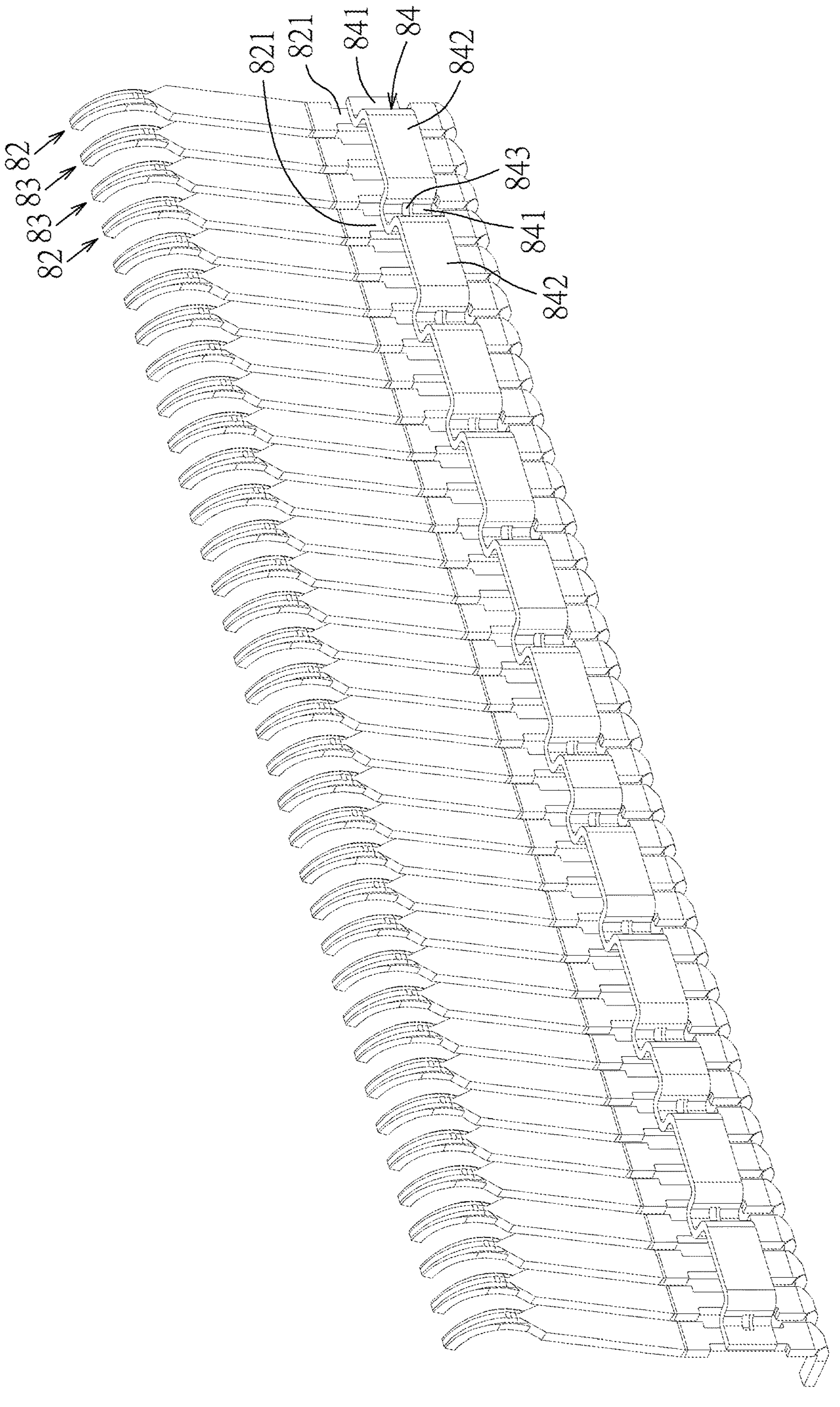
FIG. 17 is a perspective view in which the second common grounding member is engaged with the second ground terminals.

Referring to FIG. 1 to FIG. 3, a plug connector 100 and a receptacle connector 101 of the present disclosure mate with each other. In an embodiment, the plug connector 100 includes a plug housing 1, a row of first plug terminals 2, a row of second plug terminals 3, a first plate-shaped shielding member 4, and a second plate-shaped shielding member 5. The first plate-shaped shielding member 4 and the second plate-shaped shielding member 5 are provided between the row of first plug terminals 2 and the row of second plug terminals 3 (as shown in FIG. 11).

The plug housing 1 includes a base 11 which extends transversely, a tongue portion 12 which extends forwardly from the base 11, a stage portion 15 which is provided to the tongue portion 12, an insertion component 16, a first latching construction 17, and a second snapping construction 18. In the present embodiment, the plug housing 1 is formed by assembling a first half housing 13 and a second half housing 14. The first half housing 13 has a first base portion 131, a first plate portion 132 which protrudes forwardly from the first base portion 131, and a rear stage portion 151 which is provided to the first plate portion 132. The first base portion 131 is a transverse elongated strip shape, the first plate portion 132 is a plate-shaped structure which protrudes forwardly from the first base portion 131, and the rear stage portion 151 is a boss that raises upwardly from a top surface of the first plate portion 132. The second half housing 14 has a second base portion 141, a second plate portion 142 which protrudes forwardly from the second base portion 141, and a front stage portion 152 which is provided to the second plate portion 142. The second plate portion 142 is a plate-shaped structure which protrudes forwardly from the second base portion 141, and the front stage portion 152 is a boss which raises upwardly from a top surface of the second plate portion 142. The insertion component 16 is provided between the rear stage portion 151 and the front stage portion 152, and provides insertion between rear stage portion 151 and the front stage portion 152 to form the stage portion 15. In the present embodiment, the insertion component 16 includes an insertion block 161 which protrudes forwardly from a front end of the rear stage portion 151 and an insertion groove 162 which is recessed from a rear end of the front stage portion 152 and is opened rearwardly. The insertion block 161 is insertable into the insertion groove 162. In addition, a top surface of the insertion block 161 is provided with ribs 163 which extend along a front-rear direction and is used to interfere with an inner surface of the insertion groove 162 so as to strengthen a holding force on the insertion block 161 when the insertion block 161 inserts into the insertion groove 162.

The first latching construction 17 is provided between the first base portion 131 and the second base portion 141. In the present embodiment, the first latching construction 17 includes two latching blocks 171 which are provided on two sides of the first base portion 131 respectively, two recessed rails 172 which are provided on two sides of the second base portion 141, and two cooperative latching blocks 173 which are provided in the two recessed rails 172 respectively. In the present embodiment, the two sides of the second base portion 141 each are formed with a guide rail 141*a* and the recessed rail 172, and one of the two sides of the second base portion 141 is additionally provided with a group of additional terminals 19. The cooperative latching block 173 is formed in the recessed rail 172 and is close to the rear. The two sides of the first base portion 131 can respectively slide into the recessed rails 172 which are provided on the two sides of the second base portion 141, and the two latching blocks 171 latch with the two cooperative latching blocks 173, respectively. When the latching block 171 latches with the cooperative latching block 173, the latching block 171 passes forwardly over the cooperative latching block 173 and then is stopped by the cooperative latching block 173 from behind. The second snapping construction 18 is provided between a rear end of the first base portion 131 and a rear end of the second base portion 141. In the present embodiment, the second snapping construction 18 includes a snapping ring 181 which is provided to the rear end of the first base portion 131 and a snapping block 182 which is provided to the rear end of the second base portion 141. Specifically, the snapping ring 181 is formed to extend downwardly from a bottom portion of the first base portion 131.

When the first half housing 13 and the second half housing 14 are assembled and engaged with each other, the first base portion 131 of the first half housing 13 and the second base portion 141 of the second half housing 14 are assembled to form the base 11 of the plug housing 1. Here, the first base portion 131 is engaged between the recessed rails 172 which are respectively provided on the two sides of the second base portion 141, the two latching blocks 171 respectively latch with the two cooperative latching blocks 173, the snapping ring 181 which is provided to the rear end of the first base portion 131 snaps into the snapping block 182 which is provided to the rear end of the second base portion 141, the first plate portion 132 of the first half housing 13 and the second plate portion 142 of the second half housing 14 are assembled to form the tongue portion 12 of the plug housing 1, and the first plate portion 132 is positioned above the second plate portion 142.

Figure 4:
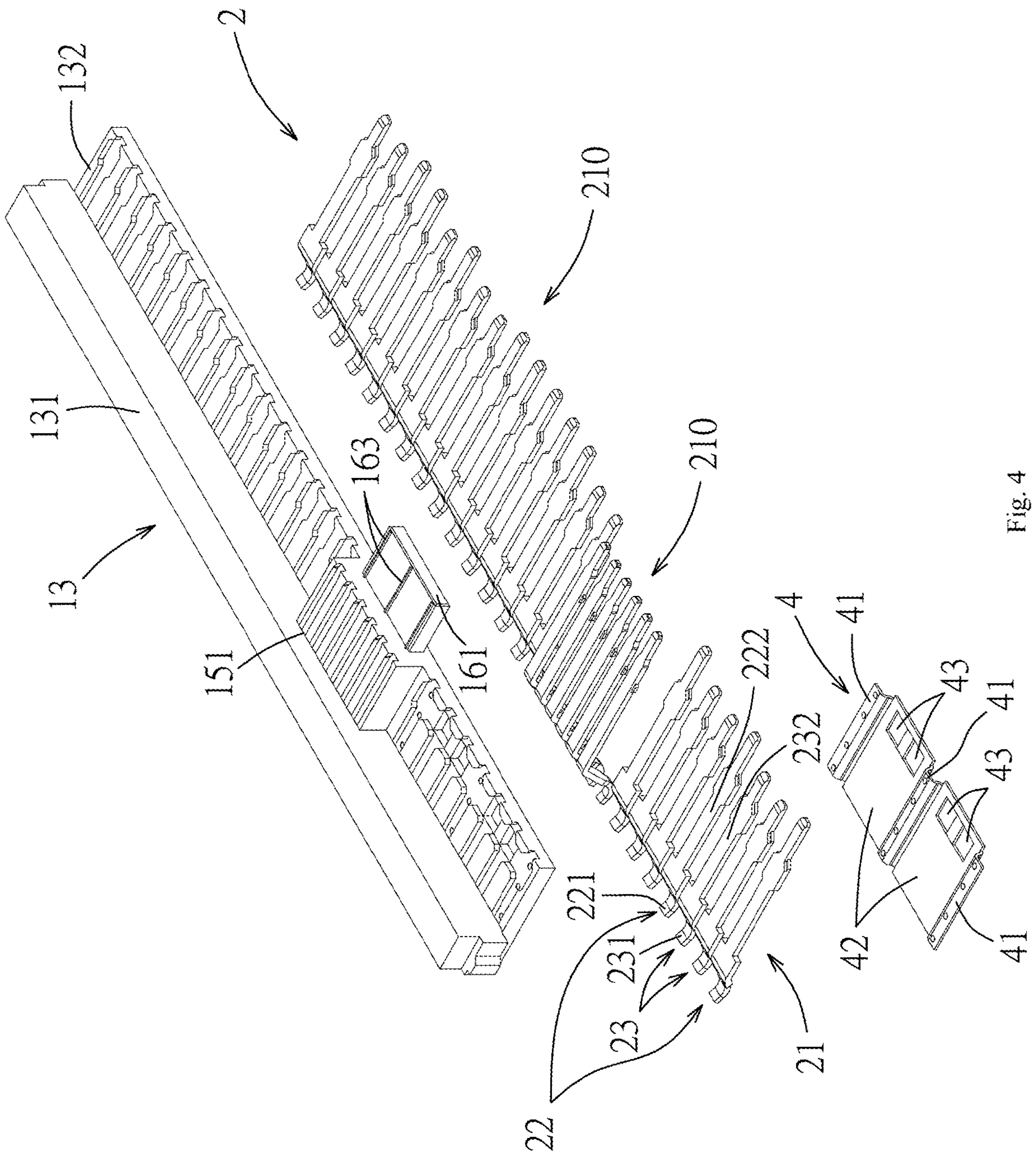
FIG. 4 is a perspective exploded view of the first half housing, a first set of plug terminals and a first plate-shaped shielding member.

Referring to FIG. 2 and FIG. 4, the first plug terminals 2 are provided to the first half housing 13 and thus are positioned as an upper row of the plug connector 100. The first plug terminals 2 include a first set of plug terminals 21 which are distributed on the first plate portion 132 at one side of the rear stage portion 151, and other plug terminals 210 which are distributed on the rear stage portion 151 and the first plate portion 132 at the other side of the rear stage portion 151. Each first plug terminal 2 has a first plate-shaped contact portion. In the present embodiment, the first set of plug terminals 21 include a plurality of first ground terminals 22 and a plurality of first signal terminals 23. The plurality of first ground terminals 22 and the plurality of first signal terminals 23 are alternately arranged, the two first signal terminals 23 are distributed between every two first ground terminals 22, and the two first signal terminals 23 forms a differential signal terminal pair. Each first ground terminal 22 includes a tail portion 221 and a first plate-shaped contact portion 222 which are connected with each other. Side protrusions 223 are respectively provided on two sides of the first plate-shaped contact portion 222 respectively at partial positions of the first plate-shaped contact portion 222 and are used to increase a holding force. Each first signal terminal 23 includes a tail portion 231 and a first plate-shaped contact portion 232 which are connected with each other. Side protrusions 233 are respectively provided on two sides of the first plate-shaped contact portion 232 respectively at partial positions of the first plate-shaped contact portion 232, so as to increase a holding force. The tail portion 221 of the first ground terminal 22 and the tail portion 231 of the first signal terminal 23 may be exposed from behind the first half housing 13, so as to be soldered and fixed to a circuit board 102 which is positioned behind the first half housing 13. The first plate-shaped contact portion 222 and the first plate-shaped contact portion 232 are positioned on an upper surface of the first plate portion 132, that is, an upper surface of the tongue portion 12. A front end of each first plug terminal 2 protrudes forwardly from the first plate portion 132. Also, in the present embodiment, a front end of the second plate portion 142 of the second half housing 14 is provided with recessed grooves 143 such that, when the first half housing 13 and the second half housing 14 are assembled and engaged with each other, each recessed groove 143 is used to receive the front end of the corresponding first plug terminal 2 which protrudes from the first plate portion 132.

Figure 5:
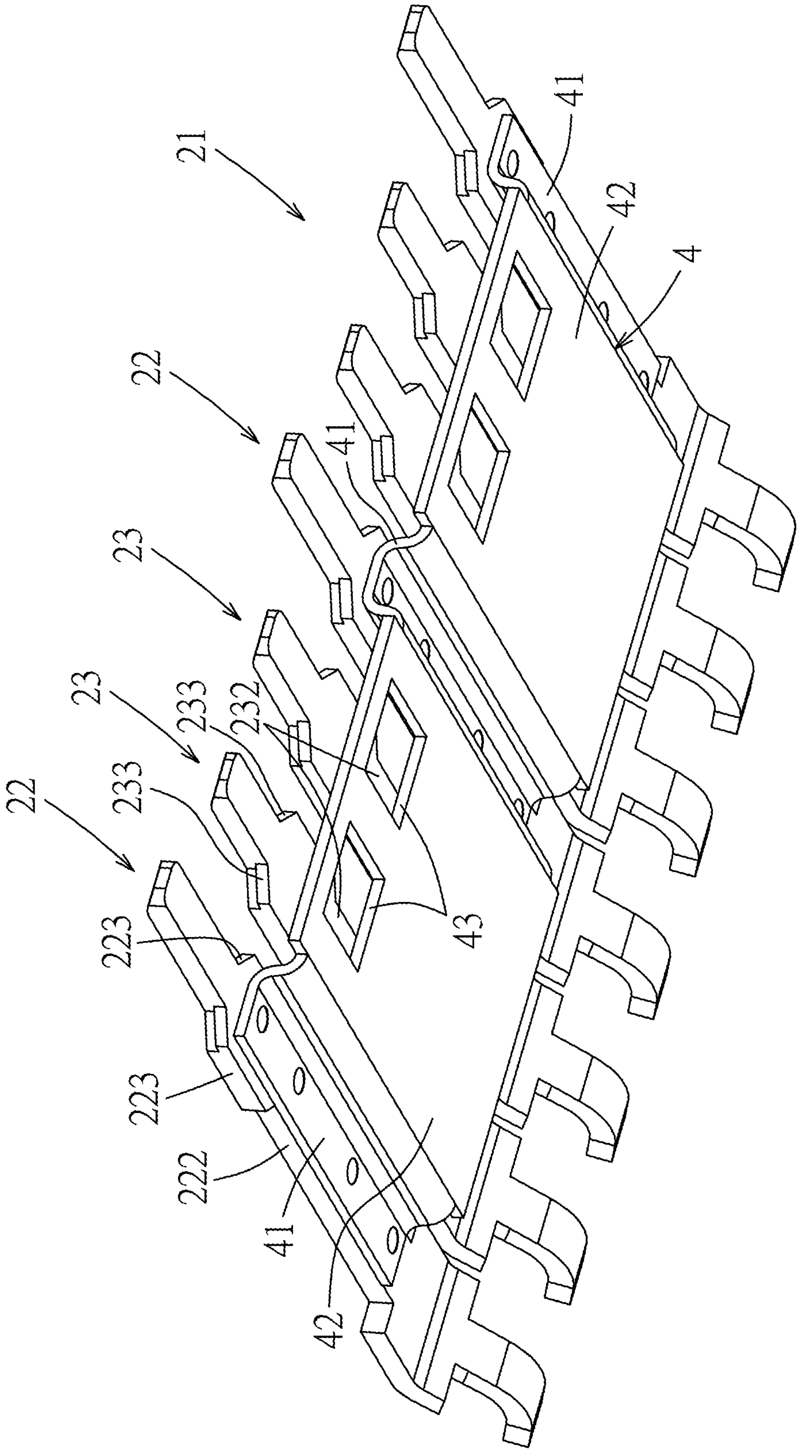
FIG. 5 is a perspective view in which the first plate-shaped shielding member is engaged with the first set of plug terminals.

Referring to FIG. 4 and FIG. 5, the first plate-shaped shielding member 4 is provided below the first plate-shaped contact portions 222, 232 of the first set of plug terminals 21. The first plate-shaped shielding member 4 includes multiple first welding portions 41 and first transverse shielding plate portions 42 which each are connected between every two corresponding first welding portions 41. The first welding portion 41 is welded to the first plate-shaped contact portion 222 of the first ground terminal 22. The first transverse shielding plate portion 42 transversely crosses and covers the first plate-shaped contact portion 232 of the corresponding two first signal terminals 23 without contacting the first plate-shaped contact portions 232 of the corresponding two first signal terminals 23. In the present embodiment, the first transverse shielding plate portion 42 is plate-shaped, and the first welding portions 41 bend and protrude upwardly respectively from opposite sides of the first transverse shielding plate portion 42 toward the first ground terminal 22, so that the first plate-shaped shielding member 4 wholly is a structure which is substantially similar to a corrugated plate. The first welding portion 41 is welded and fixed on a lower surface of the first plate-shaped contact portion 222 of the first ground terminal 22. The first transverse shielding plate portion 42 and the first plate-shaped contact portion 232 of the first signal terminal 23 are maintained to be spaced apart from each other without contacting each other. Also, in the present embodiment, the first transverse shielding plate portion 42 of the first plate-shaped shielding member 4 is provided with windows 43 which each correspond to the corresponding first signal terminal 23 in position. A position of the windows 43 substantially corresponds to the first plate-shaped contact portion 232, where the window 43 may be used to adjust impedance and lower insertion loss.

In the present embodiment, the first plug terminals 2 and the first plate-shaped shielding member 4 are integrally engaged with the first half housing 13 through in-mold injection molding while making the first plate-shaped contact portions 222, 232 of the first set of plug terminals 21 exposed to the upper surface of the first plate portion 132 and making the first plate-shaped shielding member 4 exposed to a lower surface of the first plate portion 132.

Figure 6:
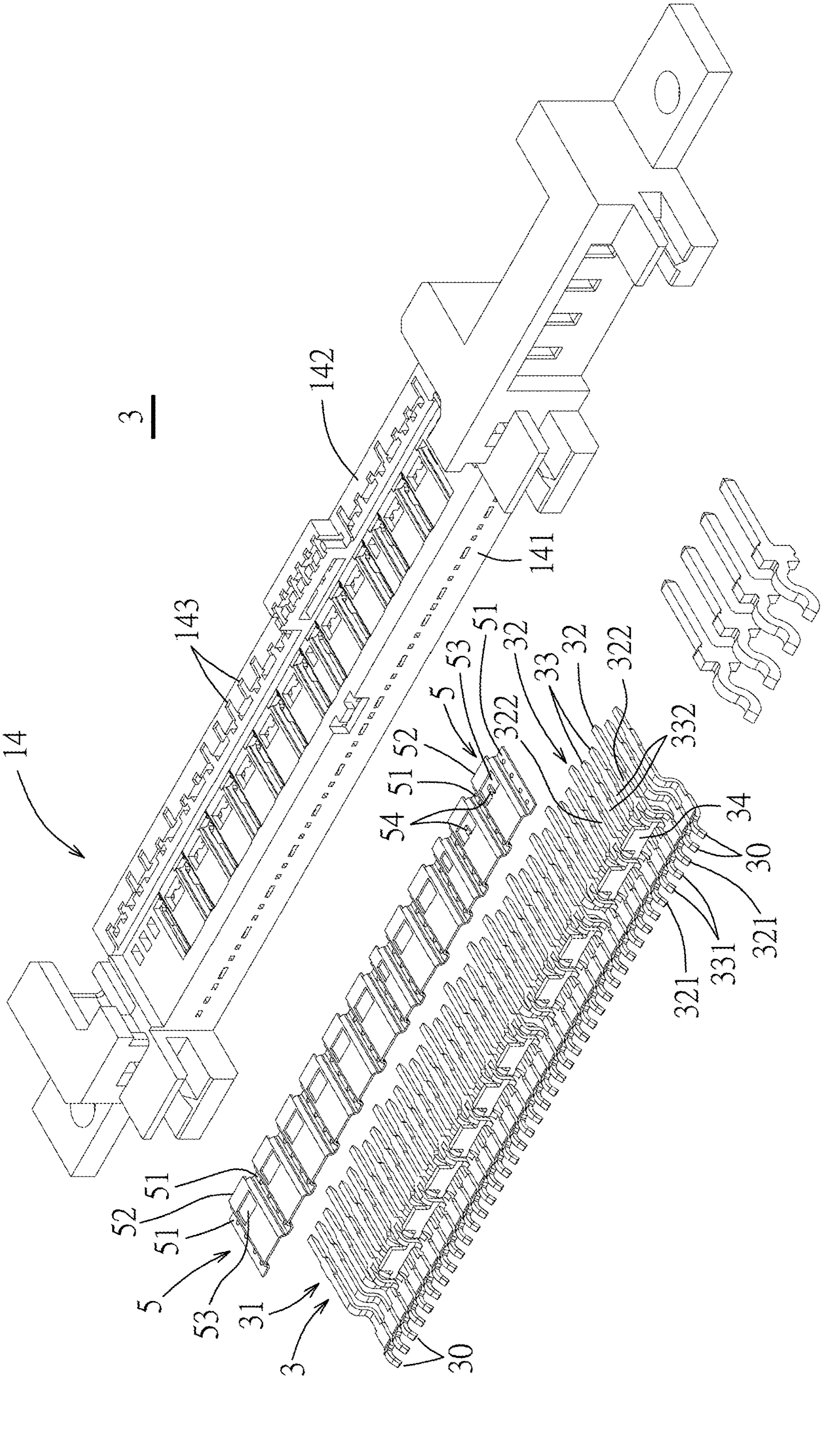
FIG. 6 is a perspective exploded view of the second half housing, a second set of plug terminals and a second plate-shaped shielding member.
Figure 7:
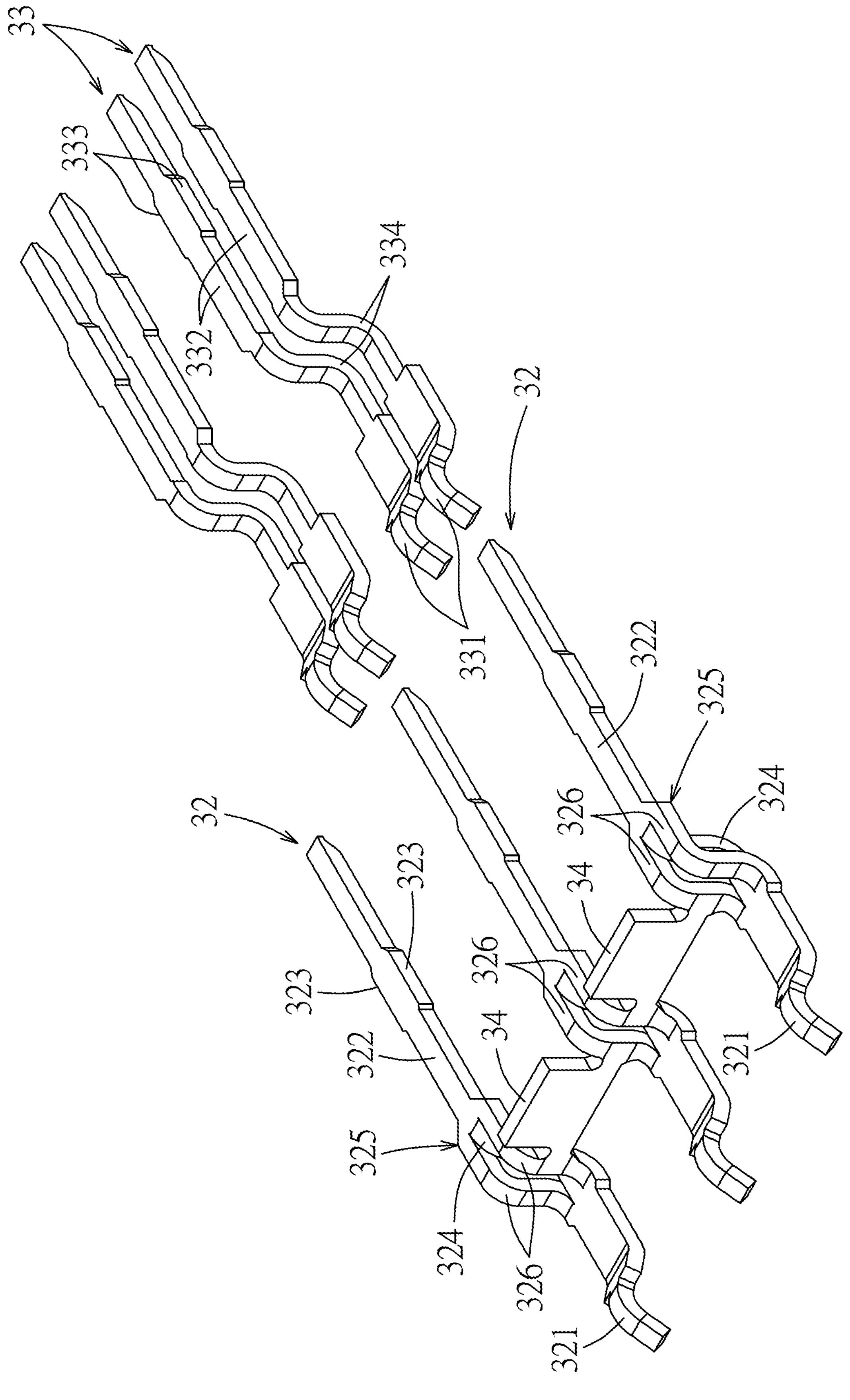
FIG. 7 is a perspective exploded view of second ground terminals and second signal terminals of the second set of plug terminals.

Referring to FIG. 2, FIG. 6, and FIG. 7, the second plug terminals 3 are provided to the second half housing 14 and thus are positioned as a lower row of the plug connector 100. The second plug terminals 3 include a second set of plug terminals 31 and other terminals 30. Each second plug terminal 3 has a second plate-shaped contact portion. In the present embodiment, the second set of plug terminals 31 include a plurality of second ground terminals 32 and a plurality of second signal terminals 33. The plurality of second ground terminals 32 and the plurality of second signal terminals 33 are alternately arranged, the two second signal terminal 33 are distributed between every two second ground terminals 32, and the two second signal terminals 33 form a differential signal terminal pair. Each second ground terminal 32 includes a tail portion 321, a contact portion 322, a bending portion 324, and a tie bar connecting portion 325. In the present embodiment, the contact portion 322 is a plate-shaped contact portion (or is referred to as the second plate-shaped contact portion), side protrusions 323 are respectively provided to two sides of the contact portion 322 respectively at partial positions of the contact portion 322 and are used to increase a holding force, the bending portion 324 and the tie bar connecting portion 325 both are positioned between the contact portion 322 and the tail portion 321, are arranged in a left-right direction, are forked relative to each other and are spaced apart from each other in the front-rear direction, a structure of the bending portion 324 and a structure of the tie bar connecting portion 325 will be described later. Each second signal terminal 33 includes a tail portion 331, a contact portion 332, and a bending portion 334. In the present embodiment, the contact portion 332 is a plate-shaped contact portion (or is referred to as the second plate-shaped contact portion), the side protrusions 333 are respectively provided to two sides of the contact portion 332 respectively at partial positions of the contact portion 332 and are used to increase a holding force. The bending portion 334 connects the contact portion 332 and the tail portion 331 and is positioned between the contact portion 332 and the tail portion 331, where a structure of the bending portion 334 will be later described. The tail portion 321 of the second ground terminal 32 and the tail portion 331 of the second signal terminal 33 are exposed from behind the second half housing 14 so as to be soldered and fixed to the circuit board 102 which is positioned behind the second half housing 14. The contact portions 322, 332 are positioned on a lower surface of the second plate portion 142, that is, a lower surface of the tongue portion 12.

Figure 8:
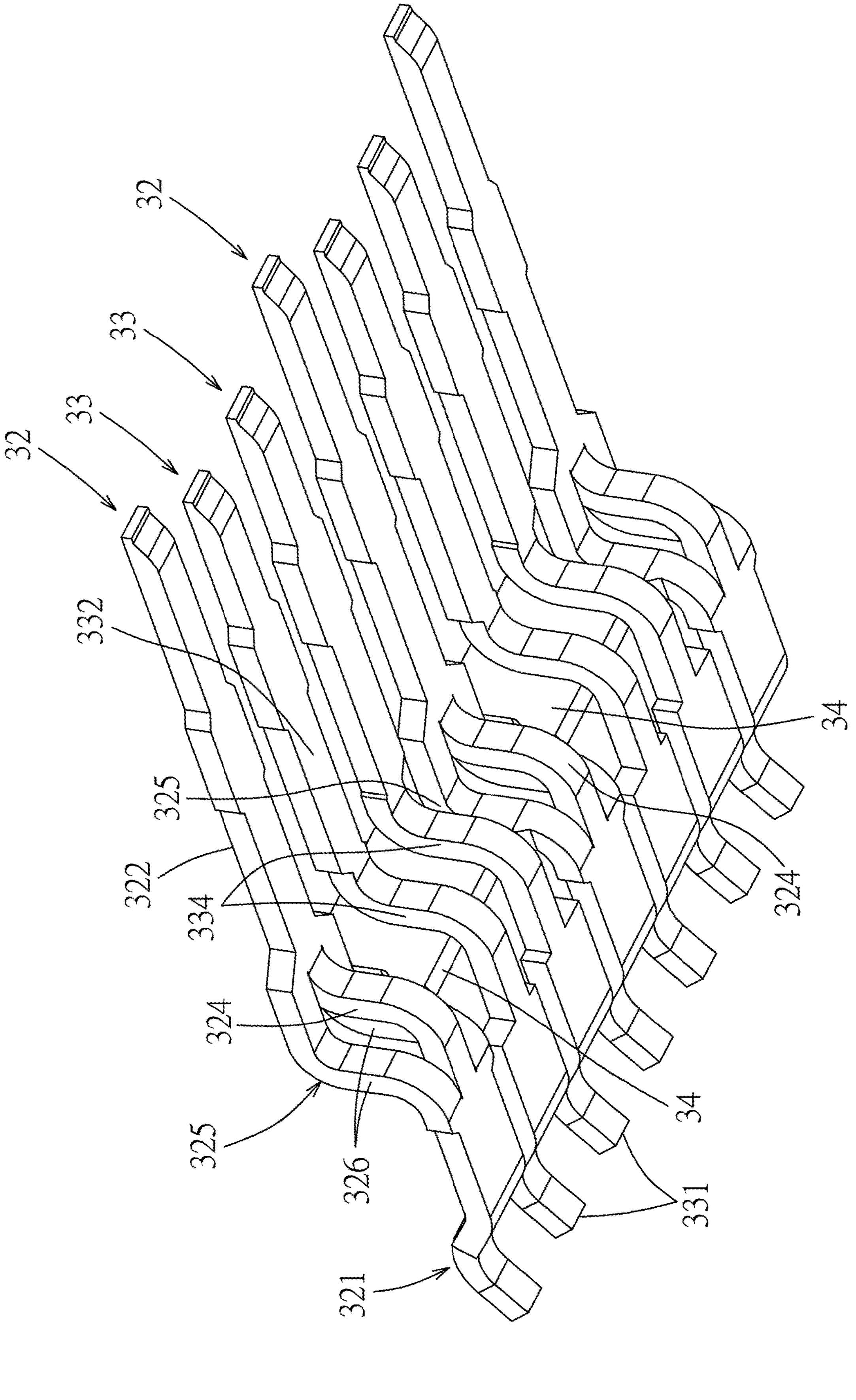
FIG. 8 is a perspective view of the second set of plug terminals.
Figure 9:
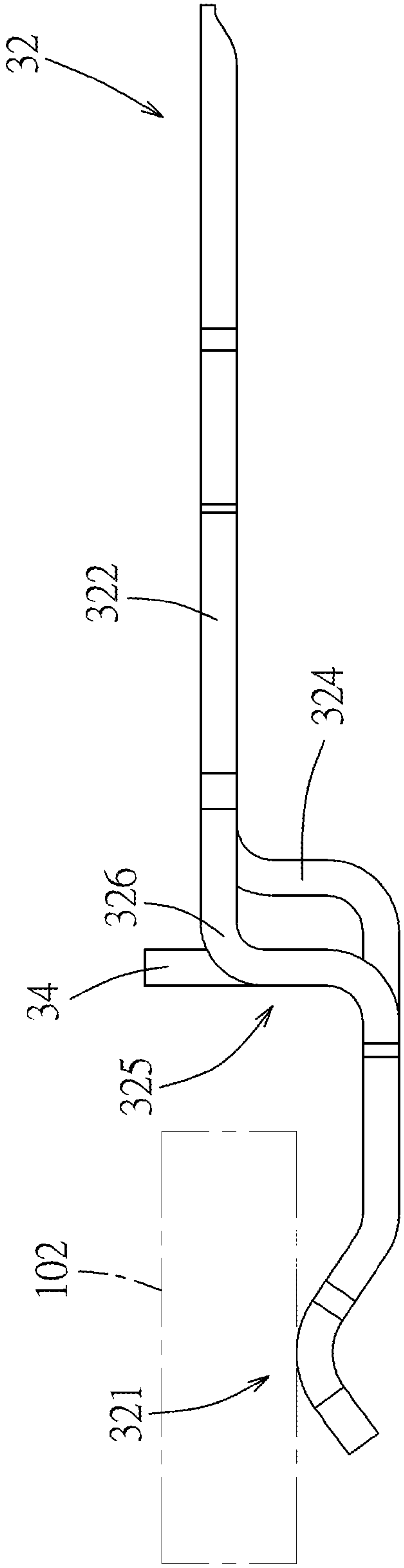
FIG. 9 is a side view of the second set of plug terminals.

Referring to FIG. 7 to FIG. 9, the bending portion 324 and the tie bar connecting portion 325 of each second ground terminal 32 are provided to be forked relative to each other and be spaced apart from each other in the front-rear direction. In the present embodiment, a manner in which the bending portion 324 and the tie bar connecting portion 325 are formed includes making a partial segment of the second ground terminal 32 where the bending portion 324 and the tie bar connecting portion 325 are presented have a wider width, and stamping a part region of a center of the tie bar connecting portion 325 to make the part region of the tie bar connecting portion 325 torn and separated in a certain length and in turn form the bending portion 324. As such, the tie bar connecting portion 325 is formed to include a pair of connecting strips 326 which are spaced apart from each other, and the bending portion 324 is separated from the center of the tie bar connecting portion 325 relative to the tie bar connecting portion 325 and is forwardly spaced apart from the center of the tie bar connecting portion 325. Also, in the present embodiment, the contact portions 332 of the second signal terminals 33 and the contact portions 322 of the second ground terminals 32 are transversely aligned with each other and are positioned in the same row, the tail portions 331 of the second signal terminals 33 and the tail portions 321 of the second ground terminals 32 are transversely aligned with each other and are positioned in the same row, and the bending portions 334 of the second signal terminals 33 and the bending portions 324 of the second ground terminals 32 are transversely aligned with each other and are positioned in the same row. In the present embodiment, the plug connector 100 further includes a plurality of tie bars 34, where each tie bar 34 is uprightly connected to two adjacent connecting strips 326 of the two tie bar connecting portions 325 of the two second ground terminals 32 which are adjacent to the tie bar 34 by way of the plurality of tie bars 34. The plurality of second ground terminals 32 may be integrally connected. Each tie bar 34 spans the two second signal terminals 33 which are positioned between the two second ground terminals 32, and the tie bar 34 is positioned behind the bending portions 334 of the two second signal terminals 33. The tie bar 34 avoids the bending portions 334 of the two second signal terminals 33 in the front-rear direction without contacting the two second signal terminals 33, and the tie bar 34 is positioned between the contact portions 332 and the tail portions 331 of the two second signal terminals 33 in the front-rear direction.

Figure 10:
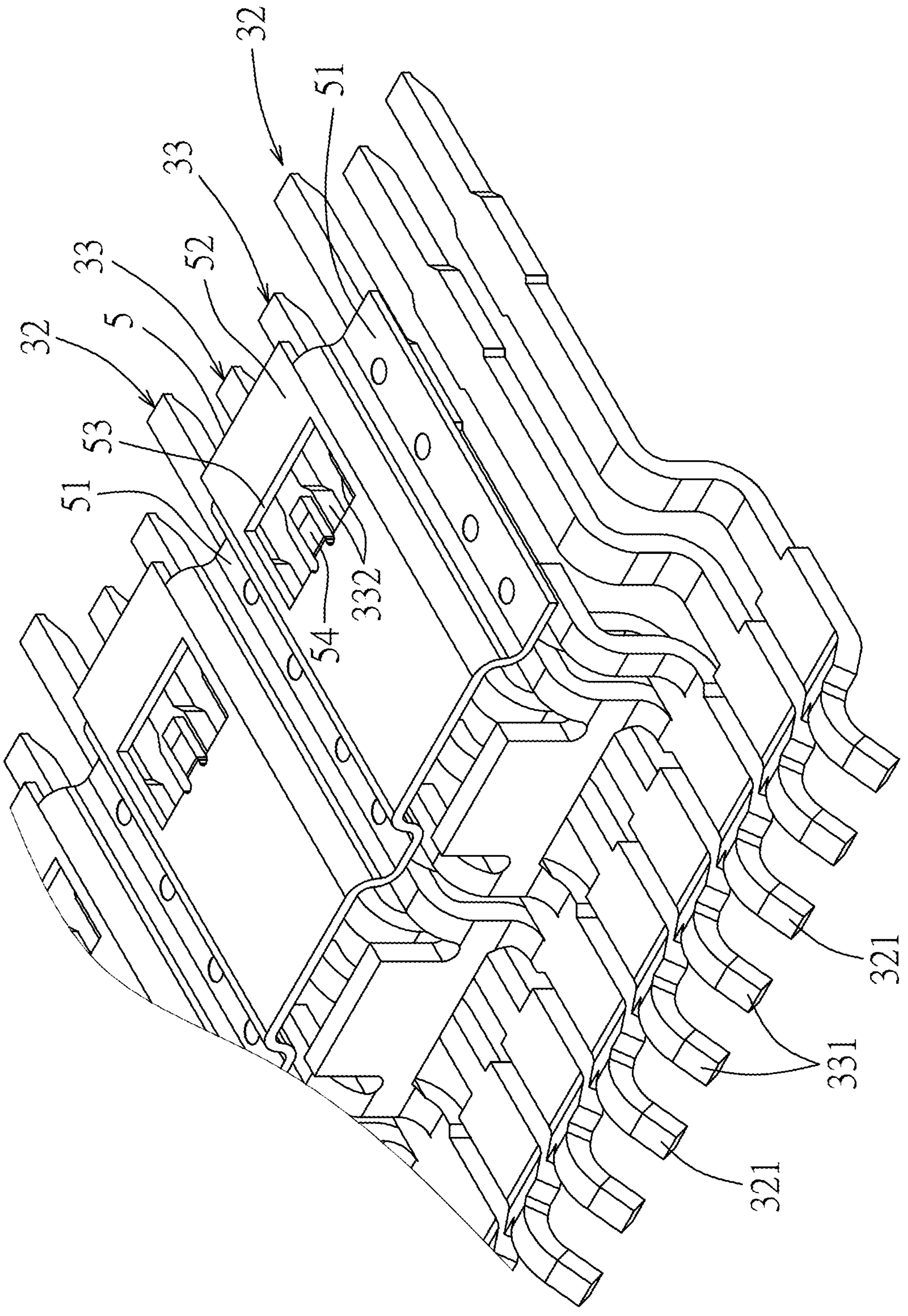
FIG. 10 is a partial perspective view in which the second plate-shaped shielding member is engaged with the second set of plug terminals.

Referring to FIG. 6 and FIG. 10, the second plate-shaped shielding member 5 is provided above the contact portions 322, 332 of the second set of plug terminals 31. The second plate-shaped shielding member 5 includes multiple second welding portions 51 and the second transverse shielding plate portions 52 which each are connected between every two corresponding second welding portions 51. The second welding portion 51 is welded to the contact portion 322 of the corresponding second ground terminal 32, and the second transverse shielding plate portion 52 transversely crosses and covers the contact portions 332 of the corresponding two second signal terminals 33 without contacting the contact portions 332 of the corresponding two second signal terminals 33. In the present embodiment, the second transverse shielding plate portion 52 is plate-shaped, the two second welding portions 51 bend and protrude respectively from two opposite sides of the second transverse shielding plate portion 52 toward the two corresponding second ground terminals 32. Thus, the second plate-shaped shielding member 5 wholly is a structure which is substantially similar to a corrugated plate, the second welding portion 51 is welded and fixed on an upper surface of the contact portion 322 of the corresponding second ground terminal 32, and the second transverse shielding plate portion 52 and the contact portion 322 of the second signal terminal 32 are maintained to be spaced apart from each other without contacting each other. Also, in the present embodiment, the second transverse shielding plate portion 52 of the second plate-shaped shielding member 5 is provided with windows 53 where each window 53 corresponds to the contact portions 322 of the two second signal terminals 33 in position. The window 53 adjusts impedance and lowers insertion loss. The first welding portion 41 or the second welding portion 51 may be connected by laser welding, ultrasonic welding, or the like. As shown in FIG. 5 and FIG. 10, each first welding portion 41 or each second welding portion 51 may have four welding points, but the number of welding point may be changed depending on a design, or an elongated continuous welding may be employed.

In the present embodiment, the second plug terminal 3 and the second plate-shaped shielding member 5 are integrally engaged with the second half housing 14 through in-mold injection molding with making the contact portions 322, 332 of the second set of plug terminals 31 exposed to the lower surface of the second plate portion 142 and making the second plate-shaped shielding member 5 exposed to the upper surface of the second plate portion 142 and positioned above the second plug terminals 3.

Referring to FIG. 2, FIG. 3, and FIG. 11, after the first half housing 13 and the second half housing 14 are assembled and engaged with each other, the first plate-shaped shielding member 4 and the second plate-shaped shielding member 5 are interposed between the first set of plug terminals 21 and the second set of plug terminals 31. Also, the first plate-shaped shielding member 4 and the second plate-shaped shielding member 5 are mechanically and electrically connected with each other. In the present embodiment, some of the second transverse shielding plate portions 52 of the second plate-shaped shielding member 5 further include contact fingers 54 where each contact finger 54 enters into the corresponding window 53. After the first half housing 13 and the second half housing 14 are assembled and engaged with each other, the second plate-shaped shielding member 5 and the first plate-shaped shielding member 4 are mechanically and electrically connected with each other via the contact fingers 54; however, the contact finger 54 also may be formed to the first plate-shaped shielding member 4. In the plug connector 100, by the structural design of the first plate-shaped shielding member 4 and the second plate-shaped shielding member 5, and due to the first plate-shaped shielding member 4 and the second plate-shaped shielding member 5 being provided between the first set of plug terminals 21 in the upper row and the second set of plug terminals 31 in the lower row, crosstalk between the signal terminals in the upper and the signal terminals in the lower row can be lowered, more complete and full shielding function can be formed with respect to the signal terminals, crosstalk is lowered, impedance of the terminal is lowered, coupling between differential signal terminal pairs are strengthened so that integrity of the signal is promoted, and transmission speed of the signal is increased. Also, a position where the first plate-shaped shielding member 4 is connected to the first ground terminal 22 is positioned at the first plate-shaped contact portion 222 and a position where the second plate-shaped shielding member 5 is connected to the second ground terminal 32 is positioned at the first plate-shaped contact portion 232. A distance between a grounding position where the first plate-shaped shielding member 4 is connected to the first ground terminal 22 and a position of actual contact point where the first ground terminal 22 is mated is shortened, and a distance between a grounding position where the second plate-shaped shielding member 5 is connected to the second ground terminal 32 and a position of actual contact point where the second ground terminal 32 is mated is shortened. In turn, a grounding effect is enhanced.

In addition, due to the tie bar 34 being positioned behind the signal terminals, crosstalk between the signal terminals and the circuit board 102 positioned behind the signal terminals can be shielded.

Referring to FIG. 1 and FIG. 12 to FIG. 14, an embodiment of the receptacle connector 101 of the present disclosure includes a receptacle housing 6, a row of first receptacle terminals 7, and a row of second receptacle terminals 8. The receptacle connector 101 may be provided on a circuit board 103. Two guide posts 61 are respectively formed at two sides of the receptacle housing 6, and are used to play guiding function since the two guide posts 61 respectively enter into the two guide rails 141*a* at the two sides of the second base portion 141 when the plug connector 100 is inserted into the receptacle connector 101. The first receptacle terminals 7 include a first set of receptacle terminals 71 and other receptacle terminals 710. The first set of receptacle terminals 71 include first ground terminals 72 and first signal terminals 73 which are alternately arranged. The first receptacle terminals 7 further include a first common grounding member 74 and a first holding base 75. The two first signal terminals 73 are provided between every two first ground terminals 72 and the two first signal terminals 73 form a differential signal terminal pair. Each first ground terminal 72 has a fixed portion 721 which is fixed to the receptacle housing 6. Each first signal terminal 73 has a fixed portion 731 which is fixed to the receptacle housing 6. The first common grounding member 74 has protruding connection portions 741 each of which are positioned toward the corresponding first ground terminal 72 and transverse bridge portions 742 each of which are positioned between two corresponding protruding connection portions 741. The first common grounding member 74 wholly is a structure which is substantially similar to a corrugated plate. The protruding connection portions 741 of the first common grounding member 74 are respectively connected to the fixed portions 721 of the first ground terminals 72 by welding. The transverse bridge portion 742 transversely crosses the two first signal terminals 73 which are positioned between every two corresponding first ground terminals 72 and the transverse bridge portion 742 does not contact the two first signal terminals 73. The first common grounding member 74 and the fixed portions 721, 731 of the first set of receptacle terminals 71 of the first receptacle terminals 7 are together embedded in the first holding base 75 through in-mold injection molding. The first set of receptacle terminals 71 entirely are assembled to the receptacle housing 6 by the first holding base 75. Other receptacle terminals 710 may be pins which are fixed to the receptacle housing 6.

In the present embodiment, each protruding connection portion 741 of the first common grounding member 74 further includes a flowing passageway 743. Specifically, the flowing passageway 743 is a grooved hole which extends transversely and penetrates the protruding connection portion 741. The flowing passageway 743 allows a material which is used to form the first holding base 75 in injection molding to flow therethrough and fill therein, so as to strengthen an engagement force between the first holding base 75 and the first common grounding member 74. In the present embodiment, the first holding base 75 has corresponding recessed holes 751 which are used to allow the protruding connection portions 741 of the first common grounding member 74 and the fixed portions 721 of the first ground terminals 72 to be exposed therein respectively. A jig is used to clamp the protruding connection portion 741 of the first common grounding member 74 and the fixed portion 721 of the first ground terminal 72 in a process of integral injection molding. After the process is completed and the jig is removed, the recessed holes 751 are formed on the first holding base 75.

Referring to FIG. 12 and FIG. 16 to FIG. 18, the second receptacle terminals 8 include a second set of receptacle terminals 81 and other receptacle terminals 80 which are positioned at two outer sides of the second set of receptacle terminals 81, respectively. The second set of receptacle terminals 81 include a plurality of second ground terminals 82 and a plurality of second signal terminals 83 which are alternately arranged, as well as a second common grounding member 84 and a second holding base 85, where every two second signal terminals 83 form a differential signal terminal pair. Each second ground terminal 82 has a fixed portion 821 which is used to be fixed to the receptacle housing 6. Each second signal terminal 83 has a fixed portion 831 which is used to be fixed to the receptacle housing 6. The second common grounding member 84 has protruding connection portions 841 which are toward the second ground terminals 82 respectively and transverse bridge portions 842 which each are positioned between the two corresponding protruding connection portions 841. Thus, the second common grounding member 84 wholly has a structure which is substantially similar to a corrugated plate. The protruding connection portions 841 of the second common grounding member 84 are respectively connected to the fixed portions 821 of second ground terminals 82 by welding, so that the transverse bridge portion 842 transversely crosses the two second signal terminals 83 which are positioned between every two corresponding second ground terminals 82 and the transverse bridge portion 842 does not contact the two second signal terminals 83. The second common grounding member 84 and the fixed portions 821, 831 of the second set of receptacle terminals 81 of the second receptacle terminals 8 are together embedded in the second holding base 85 through in-mold injection molding. The second set of receptacle terminals 81 entirely are assembled to the receptacle housing 6 by the second holding base 85. Other receptacle terminals 80 may be pins which are fixed to the receptacle housing 6.

In the present embodiment, each protruding connection portion 841 of the second common grounding member 84 further has a flowing passageway 843. Specifically, the flowing passageway 843 is a grooved hole which extends transversely and penetrates the protruding connection portion 841. The flowing passageway 843 allows a material which is used to form the second holding base 85 to flow therethrough and fill therein, so as to strengthen an engagement force between the second holding base 85 and the second common grounding member 84. In addition, in the present embodiment, the second holding base 85 has corresponding recessed holes 851 which are used to allow the protruding connection portions 841 of the second common grounding member 84 and the fixed portions 821 of the plurality of second ground terminals 82 to be respectively exposed therein. A jig is used to clamp the protruding connection portion 841 of the second common grounding member 84 and the fixed portion 821 of the second ground terminal 82 in a process of integral injection molding. After the process is completed and the jig is removed, the recessed holes 851 are formed on the second holding base 85.

Figure 18:
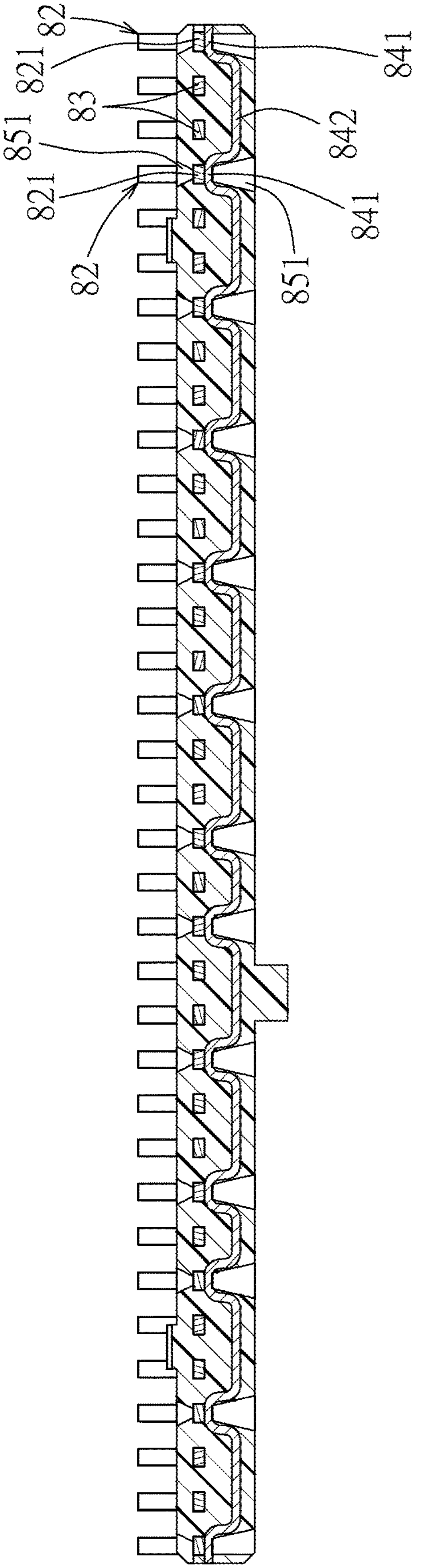
FIG. 18 is a partial cross-sectional view of the embodiment of the receptacle connector illustrating a position relationship between the second common grounding member and the second ground terminals.

Referring to FIG. 18, by provision of the first common grounding member 74 and the second common grounding member 84, when the first receptacle terminals 7 and the second receptacle terminals 8 are assembled to the receptacle housing 6, the first common grounding member 74 and the second common grounding member 84 can be positioned between the first set of receptacle terminals 71 and the second set of receptacle terminals 81. Similarly, crosstalk between the two rows of the signal terminals can be reduced, more complete and full shielding function can be formed with respect to the signal terminals, crosstalk is lowered, impedance of the terminal is lowered, coupling between the differential signal terminal pairs are strengthened so that integrity of the signal is promoted, and transmission speed of the signal is increased.

In sum, by the design and the manner of arrangement of the plate-shaped shielding members 4, 5 of the plug connector 100 and the design and the manner of arrangement of the common grounding members 74, 84 of the receptacle connector 101 in the present disclosure, crosstalk between the two rows of the signal terminals can be reduced, more complete and full shielding function can be formed with respect to the signal terminals, crosstalk is lowered, impedance of the terminal is lowered, coupling between the differential signal terminal pairs is strengthened so that integrity of the signal is promoted, and transmission speed of the signal is increased.

In addition, due to the plug housing 1 being formed by assembling the first half housing 13 and the second half housing 14, a complete assembling of the plug terminals 2 and the plate-shaped shielding member 4 and a complete assembling of the plug terminals 3 and the plate-shaped shielding member 5 can be promoted.

Due to the tie bar 34, which avoids the extension paths of the signal terminals and connects the adjacent ground terminals, the lengths of the ground terminals will not be increased and completeness of grounding between the ground terminals 22, 32 can be provided. Also, the ground terminals and the signal terminals can be completely and correspondingly arranged side by side in lengths thereof, and integrity of the signal is promoted. As the tie bar 34 is uprightly positioned between the bending portions and the tail portions of the corresponding signal terminals, crosstalk between the signal terminals and the circuit board positioned behind the signal terminals is shielded.

Additionally, whether the plug connector 100 or the receptacle connector 101, the signal terminal does not need to avoid components due to the provision of the plate-shaped shielding member 4, 5 or the common grounding members 74, 84, does not affect the holding force of the signal terminal interfering with the connector housing, and does not reduce the strength of the connector housing.

However, the above description is only for the embodiments of the present disclosure and is not intended to limit the implementing scope of the present disclosure. Simple equivalent changes and modifications made according to the claims and the contents of the specification are still included in the scope of the present disclosure.

What is claimed is:

1. A plug connector, comprising:

a plug housing comprising a base extending transversely and a tongue portion extending forwardly from the base;

a first set of plug terminals positioned in the plug housing as an upper row and comprising a plurality of first ground terminals and a plurality of first signal terminals, each first ground terminal and each first signal terminal having a first plate-shaped contact portion positioned on an upper surface of the tongue portion;

a second set of plug terminals positioned in the plug housing as a lower row and comprising a plurality of second ground terminals and a plurality of second signal terminals, each second ground terminal and each second signal terminal having a second plate-shaped contact portion positioned on a lower surface of the tongue portion;

a first plate-shaped shielding member provided below the first plate-shaped contact portions of the first set of plug terminals, the first plate-shaped shielding member comprising multiple first welding portions and first transverse shielding plate portions of which each are connected between every two corresponding first welding portions, the multiple first welding portions being welded to the first plate-shaped contact portions of the plurality of first ground terminals, and the first transverse shielding plate portions transversely crossing and covering the first plate-shaped contact portions of the corresponding first signal terminals without contacting the corresponding first signal terminals; and a second plate-shaped shielding member provided above the second plate-shaped contact portions of the second set of plug terminals, the second plate-shaped shielding member comprising multiple second welding portions and second transverse shielding plate portions of which each are connected between every two corresponding second welding portions, the multiple second welding portions being welded to the second plate-shaped contact portions of the plurality of second ground terminals, and the second transverse shielding plate portions transversely crossing and covering the contact portions of the corresponding second signal terminal without contacting the corresponding second signal terminal;

wherein the first plate-shaped shielding member is positioned above the second-plate shaped shielding member adjacent the first set of plug terminals and the second plate-shaped shielding member is positioned below the first plate-shaped shielding member adjacent the second set of plug terminals.

2. The plug connector of claim 1, wherein the first plate-shaped shielding member and the second plate-shaped shielding member are mechanically and electrically connected with each other.

3. The plug connector of claim 2, wherein at least one of:

the first plate-shaped shielding member has a first contact finger that connects to the second plate-shaped shielding member; and the second plate-shaped shielding member has a second contact finger that connects to the first plate-shaped shielding member.

4. The plug connector of claim 2, wherein:

the first plate-shaped shielding member is provided with windows which correspond to the plurality of first signal terminals; and the second plate-shaped shielding member is provided with windows which correspond to the plurality of the second signal terminals.

5. The plug connector of claim 1, wherein:

each second signal terminal comprises a tail portion and a bending portion positioned between the second plate-shaped contact portion and the tail portion, each second ground terminal comprises a tail portion, a bending portion positioned between the second plate-shaped contact portion and the tail portion and a tie bar connecting portion, the plurality of second ground terminals and the plurality of second signal terminals are alternately arranged, and the bending portion and the tie bar connecting portion of each second ground terminal are forked relative to each other and are spaced apart from each other in a front-rear direction;

the plug connector further comprises a tie bar, the tie bar being connected between the tie bar connecting portions of at least two of the plurality of second ground terminals; and the second plate-shaped contact portions of the plurality of second signal terminals and the second plate-shaped contact portions of the plurality of second ground terminals positioned between the plurality of second signal terminals are transversely aligned with each other and are positioned in the lower row, the tail portions of the plurality of second signal terminals and the tail portions of the plurality of second ground terminals positioned between the plurality of second signal terminals are transversely aligned with each other and are positioned in the same row, the bending portions of the plurality of second signal terminals and the bending portions of the plurality of second ground terminals positioned between the plurality of second signal terminals are transversely aligned with each other and are positioned in the same row.

6. The plug connector of claim 5, wherein:

the tie bar avoids the bending portions of the plurality of second signal terminals, and is uprightly positioned behind the bending portions of the plurality of second ground terminals; and the tie bar spans the plurality of second signal terminals without contacting the plurality of second signal terminals, and the tie bar is positioned between the second plate-shaped contact portions and the tail portions of the plurality of second signal terminals.

7. The plug connector of claim 6, wherein: the bending portion of each second ground terminal is separated from a center of the tie bar connecting portion relative to the tie bar connecting portion and is forwardly spaced apart from the center of the tie bar connecting portion, the tie bar connecting portion comprises a pair of connecting strips which are spaced apart from each other.

8. The plug connector of claim 1, wherein:

the plug housing comprises a first half housing and a second half housing;

the first half housing has a first base portion and a first plate portion, the first set of plug terminals and the first plate-shaped shielding member are engaged with the first half housing through integral injection molding, the first plate-shaped contact portions of the first set of plug terminals are exposed to an upper surface of the first plate portion, the first plate-shaped shielding member is exposed to a lower surface of the first plate portion;

the second half housing has a second base portion and a second plate portion, the second set of plug terminals and the second plate-shaped shielding member are engaged with the second half housing through integral injection molding, the second plate-shaped contact portions of the second set of plug terminals are exposed to a lower surface of the second plate portion, the second plate-shaped shielding member is exposed to an upper surface of the second plate portion; and the first base portion and the second base portion form the base of the plug housing, and the first plate portion and the second plate portion form the tongue portion of the plug housing.

9. The plug connector of claim 8, wherein:

the plug housing further comprises a stage portion provided to the tongue portion, the first half housing further has a rear stage portion provided to the first plate portion, the second half housing further has a front stage portion provided to the second plate portion; and the plug housing further comprises an insertion component and a first latching construction, the insertion component is provided between the rear stage portion and the front stage portion and provides insertion between the rear stage portion and the front stage portion to form the stage portion, the first latching construction is provided between the first base portion and the second base portion and provides the first base portion and the second base portion to form the base of the plug housing.

10. The plug connector of claim 9, wherein: the insertion component comprises an insertion block positioned at a front end of the rear stage portion and an insertion groove positioned at a rear end of the front stage portion, the insertion block positioned at the front end of the rear stage portion is used to insert into the insertion groove positioned at the rear end of the front stage portion.

11. The plug connector of claim 10, wherein: the insertion block is provided with a rib configured to interfere with the insertion groove, so as to strengthen a holding force on the insertion block when the insertion block is inserted into the insertion groove.

12. The plug connector of claim 9, wherein:

the first latching construction comprises two latching blocks which are respectively provided on two sides of the first base portion, two recessed rails which are respectively provided on two sides of the second base portion, and two cooperative latching blocks which are respectively provided in the two recessed rails; and the two sides of the first base portion are capable of sliding into the two recessed rails which are respectively provided on the two sides of the second base portion, and the two latching blocks latch with the two cooperative latching blocks respectively.

13. The plug connector of claim 9, wherein:

the plug housing further comprises a second snapping construction; and the second snapping construction is provided between a rear end of the first base portion and a rear end of the second base portion.

14. The plug connector of claim 13, wherein: the second snapping construction includes a snapping ring provided to the rear end of the first base portion and a snapping block provided to the rear end of the second base portion.

15. The plug connector of claim 8, wherein: front ends of the first set of plug terminals partially protrude from a front end of the first plate portion, a front end of the second plate portion is provided with recessed grooves, and the recessed grooves are used to respectively receive the front ends of the first set of plug terminals that protrude from the first plate portion.

16. A plug connector, comprising:

a plug housing;

a plug terminal provided to the plug housing, the plug terminal comprising:

a plurality of signal terminals, each signal terminal having a contact portion, a tail portion, and a bending portion positioned between the contact portion and the tail portion;

a plurality of ground terminals that are alternately arranged with the plurality of signal terminals, each ground terminal having a tie bar connecting portion, a contact portion, a tail portion, and a bending portion positioned between the contact portion and the tail portion, and the bending portion and the tie bar connecting portion of each ground terminal are forked relative to each other and are spaced apart from each other in a front-rear direction; and a tie bar connected between tie bar connections of at least two of the plurality of ground terminals; and the contact portions of the plurality of signal terminals and the contact portions of the plurality of ground terminals positioned between the plurality of signal terminals being transversely aligned with each other and being positioned in a same row, the tail portions of the plurality of signal terminals and the tail portions of the plurality of ground terminals positioned between the plurality of signal terminals being transversely aligned with each other and being positioned in the same row, and the bending portions of the plurality of signal terminals and the bending portions of the plurality of ground terminals positioned between the plurality of signal terminals being transversely aligned with each other and being positioned in the same row.

17. The plug connector of claim 16, wherein:

the tie bar avoids the bending portions of the plurality of signal terminals, and is uprightly positioned behind the bending portions of the plurality of ground terminals; and the tie bar spans the plurality of signal terminals without contacting the plurality of signal terminals, and the tie bar is positioned between the contact portions and the tail portions of the plurality of signal terminals.

18. The plug connector of claim 17, wherein:

the bending portion of each ground terminal is separated from a center of the tie bar connecting portion relative to the tie bar connecting portion and is forwardly spaced apart from the center of the tie bar connecting portion; and the tie bar connecting portion comprises a pair of connecting strips which are spaced apart from each other.

* * * * *